(12) United States Patent
Bent et al.

(10) Patent No.: US 8,386,383 B1
(45) Date of Patent: *Feb. 26, 2013

(54) MONEY FUND BANKING SYSTEM WITH MULTIPLE BANKS AND/OR RATES

(75) Inventors: Bruce Bent, Manhasset, NY (US);
Bruce Bent, II, Manhasset, NY (US)

(73) Assignee: Island Intellectual Property LLC, Manhasset, NY (US)

( * ) Notice: Subject to any disclaimer, the term of this patent is extended or adjusted under 35 U.S.C. 154(b) by 129 days.

This patent is subject to a terminal disclaimer.

(21) Appl. No.: 12/622,979

(22) Filed: Nov. 20, 2009

Related U.S. Application Data

(63) Continuation of application No. 09/677,535, filed on Oct. 2, 2000, now Pat. No. 7,752,129, which is a continuation-in-part of application No. 09/176,340, filed on Oct. 21, 1998, now Pat. No. 6,374,231.

(51) Int. Cl.
*G06Q 40/00* (2012.01)
(52) U.S. Cl. ............... 705/40; 705/35; 705/42; 705/45; 235/379; 235/380; 235/385; 235/437; 235/470
(58) Field of Classification Search ............... 705/35, 705/42, 45; 235/379, 380, 385, 437, 470
See application file for complete search history.

(56) References Cited

U.S. PATENT DOCUMENTS

| | | | |
|---|---|---|---|
| 4,232,367 A | 11/1980 | Youden et al. | |
| 4,346,442 A | 8/1982 | Musmanno | |
| 4,376,978 A | 3/1983 | Musmanno | |

(Continued)

FOREIGN PATENT DOCUMENTS

| | | |
|---|---|---|
| JP | 10-049590 A | 2/1998 |
| WO | WO-95/23379 A1 | 8/1995 |

(Continued)

OTHER PUBLICATIONS

U.S. Appl. No. 12/025,402, filed Feb. 4, 2008, Bent.

(Continued)

*Primary Examiner* — Daniel Felten
(74) *Attorney, Agent, or Firm* — Foley & Lardner LLP

(57) ABSTRACT

A method, system and program product for managing a plurality of individual client deposits for multiple clients, the method comprising: accessing, an electronic database, comprising: aggregated account information for a plurality of Federal Deposit Insurance Corporation (FDIC)-insured and interest-bearing aggregated deposit accounts held in a plurality of banking institutions, and client information for each of a plurality of the respective clients, i, comprising (i) a total of a respective client's funds deposited across a plurality of the FDIC-insured interest-bearing aggregated accounts held in a plurality of the banking institutions; and (ii) a maximum deposit percentage of the respective client funds to be held in at least one of the banking institutions; maintaining funds for said individual clients in a plurality of the FDIC-insured, interest-bearing aggregated deposit accounts at a plurality of banking institutions, wherein each of the banking institutions has at least one of the aggregated deposit accounts; processing, by computer, client transaction data comprising data for each of one or more deposits/transfers and/or one or more withdrawals/transfers for one or more of said clients, with the data comprising a respective amount for each respective deposit/transfer and each respective withdrawal/transfer; making needed deposits to, or needed withdrawals from one or more of said aggregated deposit accounts based on the data for one or more of the deposit/transfers and/or the withdrawals/transfers and based, at least in part, on the maximum deposit percentage in the database for one or more of the clients; and updating the database based on the client's deposits/transfers and/or withdrawals/transfers.

22 Claims, 4 Drawing Sheets

U.S. PATENT DOCUMENTS

| | | |
|---|---|---|
| 4,597,046 A | 6/1986 | Musmanno et al. |
| 4,674,044 A | 6/1987 | Kalmus et al. |
| 4,694,397 A | 9/1987 | Grant et al. |
| 4,700,297 A | 10/1987 | Hagel et al. |
| 4,751,640 A | 6/1988 | Lucas et al. |
| 4,774,663 A | 9/1988 | Musmanno et al. |
| 4,953,085 A | 8/1990 | Atkins |
| 4,985,833 A | 1/1991 | Oncken |
| 5,126,936 A | 6/1992 | Champion et al. |
| 5,206,803 A | 4/1993 | Vitagliano et al. |
| 5,220,501 A | 6/1993 | Lawlor et al. |
| 5,235,507 A | 8/1993 | Sackler et al. |
| 5,262,942 A | 11/1993 | Earle |
| 5,270,922 A | 12/1993 | Higgins |
| 5,291,398 A | 3/1994 | Hagan |
| 5,297,032 A | 3/1994 | Trojan et al. |
| 5,424,938 A | 6/1995 | Wagner et al. |
| 5,631,828 A | 5/1997 | Hagan |
| 5,644,727 A | 7/1997 | Atkins |
| 5,671,363 A | 9/1997 | Cristofich et al. |
| 5,689,650 A | 11/1997 | McClelland et al. |
| 5,710,889 A | 1/1998 | Clark et al. |
| 5,765,144 A | 6/1998 | Larche et al. |
| 5,774,880 A | 6/1998 | Ginsberg |
| 5,781,654 A | 7/1998 | Carney |
| 5,802,499 A | 9/1998 | Sampson et al. |
| 5,806,048 A | 9/1998 | Kiron et al. |
| 5,806,049 A | 9/1998 | Petruzzi |
| 5,812,987 A | 9/1998 | Luskin et al. |
| 5,826,243 A | 10/1998 | Musmanno et al. |
| 5,852,811 A | 12/1998 | Atkins |
| 5,864,685 A | 1/1999 | Hagan |
| 5,875,437 A | 2/1999 | Atkins |
| 5,878,258 A | 3/1999 | Pizi et al. |
| 5,878,405 A | 3/1999 | Grant et al. |
| 5,884,285 A | 3/1999 | Atkins |
| 5,890,141 A | 3/1999 | Carney et al. |
| 5,893,078 A | 4/1999 | Paulson |
| 5,903,881 A | 5/1999 | Schrader et al. |
| 5,905,974 A | 5/1999 | Fraser et al. |
| 5,940,809 A | 8/1999 | Musmanno et al. |
| 5,941,996 A | 8/1999 | Smith et al. |
| 5,946,667 A | 8/1999 | Tull et al. |
| 5,950,175 A | 9/1999 | Austin |
| 5,974,390 A | 10/1999 | Ross |
| 5,978,779 A | 11/1999 | Stein et al. |
| 6,014,642 A | 1/2000 | El-Kadi et al. |
| 6,016,482 A | 1/2000 | Molinari et al. |
| 6,026,438 A | 2/2000 | Piazza et al. |
| 6,032,133 A | 2/2000 | Hilt et al. |
| 6,041,314 A | 3/2000 | Davis |
| 6,044,371 A | 3/2000 | Person et al. |
| 6,047,324 A | 4/2000 | Ford et al. |
| 6,049,782 A | 4/2000 | Gottesman et al. |
| 6,052,673 A | 4/2000 | Leon et al. |
| 6,088,685 A | 7/2000 | Kiron et al. |
| 6,092,056 A | 7/2000 | Tull et al. |
| 6,105,005 A | 8/2000 | Fuhrer |
| 6,108,641 A | 8/2000 | Kenna et al. |
| 6,112,191 A | 8/2000 | Burke |
| 6,119,093 A | 9/2000 | Walker et al. |
| 6,131,810 A | 10/2000 | Weiss et al. |
| 6,154,770 A | 11/2000 | Kostakos |
| 6,189,785 B1 | 2/2001 | Lowery |
| 6,192,347 B1 | 2/2001 | Graff |
| 6,226,623 B1 | 5/2001 | Schein et al. |
| 6,317,783 B1 | 11/2001 | Freishtat et al. |
| 6,324,523 B1 | 11/2001 | Killeen et al. |
| 6,363,360 B1 | 3/2002 | Madden |
| 6,374,231 B1 | 4/2002 | Bent et al. |
| 6,513,020 B1 | 1/2003 | Weiss et al. |
| 6,970,843 B1 | 11/2005 | Forte |
| 7,089,202 B1 | 8/2006 | McNamar et al. |
| 7,103,556 B2 | 9/2006 | Del Rey et al. |
| 7,124,101 B1 | 10/2006 | Mikurak |
| 7,133,840 B1 | 11/2006 | Kenna et al. |
| 7,203,845 B2 | 4/2007 | Sokolic et al. |
| 7,206,761 B2 | 4/2007 | Colvin |
| 7,216,100 B2 | 5/2007 | Elliott |
| 7,321,874 B2 | 1/2008 | Dilip et al. |
| 7,321,875 B2 | 1/2008 | Dilip et al. |
| 7,328,179 B2 | 2/2008 | Sheehan et al. |
| 7,376,606 B2 | 5/2008 | Jacobsen |
| 7,383,223 B1 | 6/2008 | Dilip et al. |
| 7,383,227 B2 | 6/2008 | Weinflash et al. |
| 7,392,222 B1 | 6/2008 | Hamilton et al. |
| 7,401,037 B2 | 7/2008 | Arena et al. |
| 7,440,914 B2 | 10/2008 | Jacobsen |
| 7,505,937 B2 | 3/2009 | Dilip et al. |
| 7,509,286 B1 | 3/2009 | Bent et al. |
| 7,529,709 B2 | 5/2009 | Volchek et al. |
| 7,536,340 B2 | 5/2009 | Dheer et al. |
| 7,536,350 B1 | 5/2009 | Bent et al. |
| 7,596,522 B1 | 9/2009 | Jacobsen |
| 7,603,307 B2 | 10/2009 | Jacobsen |
| 7,640,199 B1 | 12/2009 | Hyland |
| 7,657,761 B2 | 2/2010 | Sokolic et al. |
| 7,668,771 B1 | 2/2010 | Bent et al. |
| 7,672,901 B1 | 3/2010 | Bent et al. |
| 7,672,902 B1 | 3/2010 | Bent et al. |
| 7,680,716 B1 | 3/2010 | Bent et al. |
| 7,720,755 B1 | 5/2010 | Coyle |
| 7,729,987 B1 | 6/2010 | Wakim et al. |
| 7,752,107 B1 | 7/2010 | Bent et al. |
| 7,752,129 B2 | 7/2010 | Bent et al. |
| 7,756,767 B2 | 7/2010 | Cluse et al. |
| 7,769,688 B1 | 8/2010 | Bent et al. |
| 7,797,207 B1 | 9/2010 | Dilip et al. |
| 7,809,640 B1 | 10/2010 | Bent et al. |
| 7,814,017 B2 | 10/2010 | Vancini et al. |
| 7,837,100 B2 | 11/2010 | Bonalle et al. |
| 7,860,771 B2 | 12/2010 | Colvin |
| 7,873,571 B1 | 1/2011 | Wehmer |
| 7,873,573 B2 | 1/2011 | Realini |
| 7,873,677 B2 | 1/2011 | Messing et al. |
| 7,886,969 B2 | 2/2011 | Antoo et al. |
| 7,895,098 B2 | 2/2011 | Beard |
| 7,895,099 B2 | 2/2011 | Whiting et al. |
| 7,899,743 B2 | 3/2011 | Jacobsen |
| 7,899,745 B1 | 3/2011 | Jacobsen |
| 7,899,746 B1 | 3/2011 | Jacobsen |
| 7,899,747 B1 | 3/2011 | Jacobsen |
| 7,904,372 B2 | 3/2011 | Whiting et al. |
| 7,917,433 B2 | 3/2011 | Jacobsen |
| 7,921,057 B1 | 4/2011 | Jacobsen |
| 7,933,821 B1 | 4/2011 | Bent et al. |
| 7,945,511 B2 | 5/2011 | O'Brien et al. |
| 7,996,308 B1 | 8/2011 | Bent et al. |
| 8,015,085 B2 | 9/2011 | Blagg et al. |
| 8,019,667 B1 | 9/2011 | Bent et al. |
| 8,019,668 B1 | 9/2011 | Bent et al. |
| 8,032,456 B1 | 10/2011 | Bent et al. |
| 8,036,986 B2 | 10/2011 | Jacobsen |
| 8,051,004 B2 | 11/2011 | Jacobsen |
| 8,051,005 B2 | 11/2011 | Jacobsen |
| 8,086,508 B2 | 12/2011 | Dheer et al. |
| 8,090,651 B2 | 1/2012 | Winslow et al. |
| RE43,246 E | 3/2012 | Bent et al. |
| 2001/0023414 A1 | 9/2001 | Kumar et al. |
| 2001/0032182 A1 | 10/2001 | Kumar et al. |
| 2002/0007330 A1 | 1/2002 | Kumar |
| 2002/0046144 A1 | 4/2002 | Graff |
| 2002/0069147 A1 | 6/2002 | Sheehan et al. |
| 2002/0082981 A1 | 6/2002 | Madden |
| 2002/0087454 A1 | 7/2002 | Calo et al. |
| 2002/0091637 A1 | 7/2002 | Bent |
| 2002/0128951 A1 | 9/2002 | Kiron et al. |
| 2002/0161707 A1 | 10/2002 | Cole et al. |
| 2002/0165757 A1 | 11/2002 | Lisser |
| 2002/0174048 A1 | 11/2002 | Dheer et al. |
| 2002/0178098 A1 | 11/2002 | Beard |
| 2002/0194099 A1 | 12/2002 | Weiss |
| 2003/0023529 A1 | 1/2003 | Jacobsen |
| 2003/0041003 A1 | 2/2003 | Kayser, III |
| 2003/0080185 A1 | 5/2003 | Werther |
| 2003/0135437 A1 | 7/2003 | Jacobsen |
| 2003/0149646 A1 | 8/2003 | Chen et al. |

| | | | |
|---|---|---|---|
| 2003/0163403 | A1 | 8/2003 | Chen et al. |
| 2003/0177092 | A1 | 9/2003 | Paglin |
| 2003/0191702 | A1 | 10/2003 | Hurley |
| 2003/0200174 | A1 | 10/2003 | Star |
| 2003/0208438 | A1 | 11/2003 | Rothman |
| 2003/0236728 | A1 | 12/2003 | Sunderji et al. |
| 2004/0039674 | A1 | 2/2004 | Coloma |
| 2004/0107157 | A1 | 6/2004 | Bleunven et al. |
| 2004/0111361 | A1 | 6/2004 | Griffiths et al. |
| 2004/0128229 | A1 | 7/2004 | Raines et al. |
| 2004/0128235 | A1 | 7/2004 | Kemper et al. |
| 2004/0138974 | A1 | 7/2004 | Shimamura et al. |
| 2004/0153398 | A1 | 8/2004 | Baumgartner et al. |
| 2004/0162773 | A1 | 8/2004 | Del et al. |
| 2004/0177036 | A1 | 9/2004 | Nutahara et al. |
| 2004/0249741 | A1 | 12/2004 | Understein |
| 2005/0044038 | A1 | 2/2005 | Whiting et al. |
| 2005/0091137 | A1 | 4/2005 | Woeber |
| 2005/0102225 | A1 | 5/2005 | Oppenheimer et al. |
| 2005/0102226 | A1 | 5/2005 | Oppenheimer et al. |
| 2005/0108120 | A1 | 5/2005 | Malka et al. |
| 2005/0108149 | A1 | 5/2005 | Bent et al. |
| 2005/0114246 | A1 | 5/2005 | Coloma |
| 2005/0154662 | A1 | 7/2005 | Langenwalter |
| 2005/0228733 | A1 | 10/2005 | Bent et al. |
| 2006/0047593 | A1 | 3/2006 | Naratil et al. |
| 2006/0106703 | A1 | 5/2006 | Del et al. |
| 2006/0155644 | A1 | 7/2006 | Reid et al. |
| 2006/0167773 | A1 | 7/2006 | Yang et al. |
| 2006/0212389 | A2 | 9/2006 | Bent et al. |
| 2006/0213980 | A1 | 9/2006 | Geller et al. |
| 2006/0273152 | A1 | 12/2006 | Fields |
| 2007/0043666 | A1 | 2/2007 | Burdette |
| 2007/0118449 | A1 | 5/2007 | De La Motte |
| 2007/0130065 | A1 | 6/2007 | Staab et al. |
| 2007/0143196 | A1 | 6/2007 | Colvin |
| 2007/0255655 | A1 | 11/2007 | Kemper et al. |
| 2007/0271174 | A2 | 11/2007 | Bent et al. |
| 2007/0276752 | A1 | 11/2007 | Whiting et al. |
| 2007/0288400 | A1 | 12/2007 | Menon |
| 2008/0015985 | A1 | 1/2008 | Abhari et al. |
| 2008/0046358 | A1 | 2/2008 | Holm-Blagg et al. |
| 2008/0065532 | A1 | 3/2008 | De La Motte |
| 2008/0097899 | A1 | 4/2008 | Jackson et al. |
| 2008/0120228 | A1 | 5/2008 | Bent et al. |
| 2008/0133280 | A1 | 6/2008 | Ziegler |
| 2008/0133396 | A1 | 6/2008 | De La Motte |
| 2008/0222053 | A1 | 9/2008 | Jacobsen |
| 2008/0288398 | A1 | 11/2008 | Maricondi |
| 2009/0006985 | A1 | 1/2009 | Fong et al. |
| 2009/0012899 | A1 | 1/2009 | Friesen |
| 2009/0138412 | A1 | 5/2009 | Jacobsen |
| 2009/0327154 | A1 | 12/2009 | Van Vooren et al. |
| 2011/0106703 | A1 | 5/2011 | Jay et al. |
| 2011/0208640 | A1 | 8/2011 | Geoghegan et al. |
| 2011/0246359 | A1 | 10/2011 | O'Brien et al. |

FOREIGN PATENT DOCUMENTS

| | | |
|---|---|---|
| WO | WO-99/18529 | 4/1999 |
| WO | WO-02/42952 | 5/2002 |
| WO | WO-03/012580 A2 | 2/2003 |
| WO | WO-2005/006111 | 1/2005 |

OTHER PUBLICATIONS

U.S. Appl. No. 12/794,448, filed Jun. 4, 2010, Bruce Bent et al.
U.S. Appl. No. 12/794,545, filed Jun. 4, 2010, Bruce Bent et al.
U.S. Appl. No. 12/816,092, filed Jun. 15, 2010, Bruce Bent II et al.
U.S. Appl. No. 12/829,961, filed Jul. 2, 2010, Bruce Bent, et al.
Dreyfus Insured Deposit Program Disclosure Statement and Terms and Conditions, 12 pages.
Email from Olivia Kim to Charles Macedo on Jun. 9, 2010 with attachment of Lawsuit by Island Intellectual Property LLC, Lids Capital LLC, Double Rock Corporation, and Intrasweep LLC against Deutshe Bank Trust Company Americas and Total Bank Solutions, LLC, Defendant Deutsche Bank Trust Company America's responses to Intrasweep's common interrogatory Nos. 1-5, Confidential-Attorneys only, Civil Action No. 09 Civ. 2675 (VM) (AJP).
Email from Olivia Kim to Charles Macedo on May 13, 2010 with attachment of Lawsuit by Island Intellectual Property LLC, Lids Capital LLC, Double Rock Corporation, and Intrasweep LLC against Deutshe Bank Trust Company Americas and Total Bank Solutions, LLC, Defendant Deutsche Bank Trust Company America's responses to Double Rock's Common interrogatory Nos. 1-10 to defendants Reservation of Right, Civil Action No. 09 Civ. 2675 (VM)(AJP).
Garton, Thomas W.; Are LLC Banks in the Cards? Stay Tuned; Fredrikson & Byron, P.A.; Jun. 2003; http://www.fredlaw.com/articles/banking/bank_0306_twig.html; 2 pages.
Insured Bank Deposit Program Summary Information Statement, Information Statement, and list of Eligible Program Banks Effective Feb. 10, 2005, 11 pages.
Lawsuit by Island Intellectual Property LLC against Clearview Correspondent Services, LLC, et al.; Complaint for Patent Infringement; Civil Action No. 1:11-cv-448 (LO/TRJ); Apr. 26, 2011; 55 pages.
Lawsuit by Island Intellectual Property LLC against First Southwest Company; Complaint for Patent Infringement; Civil Action No. 1:11-cv-00371-UNA; Apr. 26, 2011; 42 pages.
Lawsuit by Island Intellectual Property LLC et al., against Deutsche Bank Trust Company Americas, et al.; Expert Report of Richard T. Powers Concerning Invalidity of U.S. Pat. Nos. 7,509,286; 7,519,551; 7,536,350; 7,668,771; 7,668,772, 7,672,886; and 7,680,734; and Exhibits A-R; Civil Action No. 09 Civ. 2675(VM)(AJP), Oct. 28, 2010; 1,119 pages.
Lawsuit by *Island Intellectual Property LLC v. Clearview Correspondent Services, LLC, et al.*; Branch Banking & Trust Company's Answer to Complaint and Counterclaims; Civil Action No. 1:11-cv-448-LO-IDD; Jun. 20, 2011; 13 pages.
Lawsuit by *Island Intellectual Property LLC v. Clearview Correspondent Services, LLC, et al.*; Clearview Correspondent Services, LLC's Answer to Complaint and Counterclaims; Civil Action No. 1:11-cv-448-LO-IDD; Jun. 20, 2011; 12 pages.
Lawsuit by *Island Intellectual Property LLC v. Clearview Correspondent Services, LLC, et al.*; Scott & Stringfellow, LLC's Answer to Complaint and Counterclaims; Civil Action No. 1:11-cv-448-LO-IDD; Jun. 20, 2011; 12 pages.
Lawsuit by *Island Intellectual Property LLC v. First Southwest Company*; First Southwest Company's Answer to Complaint and Counterclaims; Civil Action 1:11-cv-371-SD; Jun. 20, 2011; 11 pages.
Lawsuit by Island Intellectual Property LLC, et al. against Deutsche Bank Trust Company Americas, et al.; Expert Report of Ivan Zatkovich Regarding Validity and Enforceability of the Asserted Claims of the Patents-in-Suit; Civil Action No. 09 Civ. 2675 (VM)(AJP); Nov. 23, 2010; 192 pages. The redacted items were designated as confidential in a Protective Order in this case.
Lawsuit by Island Intellectual Property LLC, et al. against Deutsche Bank Trust Company Americas, et al.; Expert Report of the Honorable Gerald J. Mossinghoff and Exhibits A-E; Civil Action No. 09 Civ. 2675 (VM)(AJP); Nov. 23, 2010; 107 pages.
Lawsuit by Island Intellectual Property LLC, et al., against Deutsche Bank Trust Company Americas, et al.; Defendant Deutsche Bank Trust Company Americas' Fifth Supplemental Responses to Island IP's First Set of Common Interrogatories to All Defendants (No. 7); Case No. 09 Civ. 2675 (VM)(AJP); Sep. 16, 2010; 9 pages.
Lawsuit by Island Intellectual Property LLC, et al., against Deutsche Bank Trust Company Americas, et al.; Defendant Total Bank Solutions, LLC's Fifth Supplemental Responses to Island IP's First Set of Common Interrogatories to All Defendants (No. 7); Case No. 09 Civ. 2675 (VM)(AJP); Sep. 16, 2010; 9 pages.
Letter from Gilbert T. Schwartz, Skadden, Arts, Slate, Meagher & Flom to Oliver Ireland, Associate General Counsel, Board of Governors of the Federal Reserve System; Dec. 18, 1987; 19 sheets.
Letter from Roger M. Zaitzeff, Seward & Kissel to Gilbert T. Schwartz, Associate General Counsel, Board of Governors of the Federal Reserve System; May 10, 1983, 5 sheets.
Promontory Interfinancial Network: Frequently Asked Questions (FAQs), Feb. 5, 2003, 5 pages.
Lawsuit by *Island Intellectual Property LLC, et al. v. Deutsch Bank Trust Company Americas, et al.*; Defendant Deutsche Bank Trust Company Americas' Second Supplemental Responses to Double Rock's Interrogatories Nos. 2, 8 and 9, Jul. 2010, 65 pages.

Exhibit 2, Invalidity Chart: U.S. Pat. No. 4,985,833 (Oncken)—U.S. Pat. 7,668,771, Jul. 2010, 14 pages.
Exhibit 5, Invalidity Chart: Merrill Lynch Business Advantage Program—U.S. Pat. No. 7,668,772, Jul. 2010, 7 pages.
Exhibit 8, Invalidity Chart: Harken Financial Services Sweep Product—U.S. Pat. No. 7,668,771, Jul. 2010, 9 pages.
Exhibit 9, Invalidity Chart: Wayne Hummer—Insured Bank Deposit Program—U.S. Pat. No. 7,668,771, Jul. 2010, 12 pages.
Exhibit 10, Invalidity Chart: U.S. Patent Application Publication No. 2007/0043666 (Burdette), U.S. Pat. No. 7,668,771, Jul. 2010, 9 pages.
2 CDs (1) Non-Confidential Exhibits and Material regarding Deutsch Bank Trust Company Americas' (DBTCA) $2^{nd}$ Supp Res to Double Rock's Interrogatory No. 2; (2) Prior Art for IC Non-Confidential Material—Bates-numbered documents for Exhibits 2, 5, 8, 9, and 10 Invalidity Charts, Jul. 2010.
Letter to R.M. Zaitzeff, from W.W. Wiles, dated Jun. 22, 1983 (response to May 10, 1983 letter re: offering of MMDAs), 6 pages.
Letter to G.T. Schwartz, from O.I. Ireland, dated Jun. 22, 1988 (response to Dec. 18, 1987 letter re: proposed modifications to Merrill Lynch's CMA Program), 5 pages.
Information Statement, "Alliance Insured Account," Sep. 1999; 6 pages.
Investors MoneyAccounts$^{SM}$ and Insurance Plus Service Agreement, attached Schedule A (List of Banks Participating in the Insurance Plus Service), IMAD Mar. 1994, 3 pages.
Investors Money Accounts$^{SM}$ (an FDIC-insured money market account), IMA-1 (Mar. 1994), 4 pages.
Investors MoneyAccount$^{SM}$, "The FDIC-Insured Money Market Investment with an Important Plus," IMA Oct. 1995, 2 pages.
1985 SEC No-Act. Lexis 2756, Investment Company Act of 1940—Section 3(a)(1), 2(a)(36); Securities Act of 1933—Section 2(1), Nov. 29, 1985, Kemper Financial Services, Inc., 9 pages.
Insured Money Account Program Agreement and Disclosure Statement, (attached Schedule A—Deposit Account Terms), faxed Mar. 28, 2000; 10 pages.
First National Bank in Brookings, Certificates of Deposit [online] [retrieved on Jul. 17, 2009]. Retrieved from the Internet: Certificates of Deposit, <URL: http://web.archive.org/web/20000524121111/www.firstnb.com/cd.htm>; Multi-Bank CDs, <URL: http://web.archive.org/web/20000524132934/www.firstnb.com/mbcd.htm>, 5 pages.
Summary of Commentary on Current Economic Conditions by Federal Reserve Districts, Jan. 1985, 44 pages.
12 CFR Ch. II (Jan. 1, 2009 Edition), pp. 124-125.
Product Strategy, "Money Fund $$ Moving to Bank Deposits, Distributors Start to Install Bank Deposit Accounts to Replace Money Funds," 6 FRC Monitor, Dec. 2003, 2 pages.
Board of Governors of the Federal Reserve System, "The May 1998 Senior Financial Officer Survey," May 1998, (attached Appendix A: Survey Questions and Responses; Appendix B: Glossary; Appendix C: Examples of Key Reserve Concepts), 48 pages.
Interest Rate Review, A Publication of the Meyer Weekly Interest Rate Survey, "A Look at Tiers," Apr. 1987, 6 pages, vol. 11, No. 4.
LexisNexis, The American Banker, "Merrill Joins Money Market Account, CMA; Broker Begins Testing With 12 Institutions," Sep. 23, 1983, 4 pages.
Bent et al., Office Action, U.S. Appl. No. 10/071,053, with attached SB08, date considered Mar. 10, 2009, 2 pages.
Merrill Lynch & You, "Financial Services The Way You Want, When You Want Them," Jan. 2000, 16 pages.
Exhibit 1, "FA/FB Account 1997 First Transactions, TRX Types: PU, PP, TA, PT," Aug. 2003, p. 1-2.
Advertisement: Where Your Interest is?, Mutual Funds, Oct. 1997; 1 page.
Advertisement: It's 1997, Do You Know Where Your Interest is?, Mutual Funds, Dec. 1993, p. 46.
USPTO Office Action, Interview Summary, U.S. Appl. No. 11,767,827, Date Mailed Sep. 23, 2009, 4 pages.
USPTO Office Action, Office Action Summary, U.S. Appl. No. 11,767,827, Date Mailed Jun. 5, 2009, 35 pages.
Service Mark Application, Applicant: Reserve Management Corporation, Mark: Reserve Insured Deposits, (attached Power of Attorney, Declaration, Drawing Page, Sep. 21, 2001, 6 pages.
Letter to R.L. Kratzer, from T.J. Vezeau, Re: United States Patent No. 6,374,231, dated Jan. 10, 2003, 1 page.
Letter to C.R. Macedo, from R.L. Rainey, Re: Promontory Interfinancial Network, LLC, dated Jul. 22, 2008, (attached Attachments A-E), 35 pages.
Letter to C.R. Macedo, from R.L. Rainey, Re: Promontory Interfinancial Network, LLC, dated Oct. 16, 2008, (attached Attachments A-C), 22 pages.
Letter to C.R. Macedo, from R.L. Rainey, Re: Promontory Interfinancial Network, LLC, dated Feb. 23, 2009, (attached Exhibit A-B), 21 pages.
Letter to R.L. Kratzer, from T.J. Vezeau, Re: United States Patent No. 6,374,231, dated Jan. 10, 2003 (with various attachments), 128 pages.
Memo to Bruce Bent, from Bruce Bent II, Re: S&M Status, Oct. 15, 1997 (cc: Arthur, Mary, Marianne, Joe, Pat, Cathy, Michelle), 1 page.
Memo to Marianne, Ralph, Customer Service, from Bruce Bent II, Re: Reserve IDA, Sep. 4, 1997, 1 page.
Memo to Marianne, Pat, Bruce Bent, from Bruce Bent II, Re: Reserve Insured Deposit Account, Sep. 4, 1997, 1 page.
American Express—Meeting Notes, Sep. 26, 2000, 2 pages.
American Express Financial Advisors Customized FDIC Product with Tiered Balances, Jan. 24, 2001, 2 pages.
American Express Conference Call Minutes, Topic: Tiered Balances, Jan. 25, 2001 @ 3:00pm-4:00pm, 2 pages.
Letter to A.J. Bufalino, from C.R. Macedo, Re: Reserve Management Corporation, Wayne Hummer Investments LLC, May 8, 2007, (enclosing Jan. 3, 2006 letter to A.J. Bufalino, Feb. 23, 2006 letter to A.J. Bufalino, Mar. 16, 2006 letter to C. Macedo, U.S. Patent No. 6,374,231, U.S. Publication No. 2002/0091637 A1, U.S. Publication No. 2005/0108149 A1, U.S. Publication No. 2005/0228733 A1, U.S. Publication No. 2006/0212385 A2, U.S. Publication No. 2006/0212389 A2), 510 pages.
Merrill Lynch & Co., Inc., Form 10-K405 (Annual Report (Regulation S-K, item 405)), Filed Mar. 14, 2002 for the Period Ending Dec. 18, 2001, 248 pages.
Merrill Lynch, "Information Statement Regarding changes to Interest Rates on Deposits in the Merrill Lynch Banks," Nov. 12, 2007, 2 pages.
QUESTessentials, "Quest Insured Account," May 17, 1994, 3 pages.
Information Statement, "Quest Insured Account," (attached Appendix A), 5 pages.
OCC Insured Bank Deposit Account (attached are p. 2 of Quest for Value Funds Daily Data, Jun. 1993; OCC Insured Account Rate Table), 3 pages.
CIBC World Markets, "Insured Bank Deposit Account," Information Statement, Jul. 1, 2000, 2 pages.
Letter to Client, from M.J. Hensle, Re: Salomon Smith Barney Bank Deposit Program$^{SM}$, (attached Q&A: Important Information about the New Salomon Smith Barney Bank Deposit Program), Aug. 16, 2020, 14 pages.
Salomon Smith Barney, "Bank Deposit Program Disclosure Statement," 3 pages.
FDIC, FDIC Law, Regulations, Related Acts—4000—Advisory Opinions, Oct. 22, 1987, J.W. Via, Jr., Counsel [online] [Retrieved on Jan. 22, 2010]. Retrieved from the Internet: URL: <http://www.fdic.gov/regulations/laws/rules/4000-2560.html>, 1 page.
FDIC, FDIC Law, Regulations, Related Acts—4000—Advisory Opinions, Jun. 28, 1993, J. A. DiNuzzo, [online] [Retrieved on Jan. 22, 2010]. Retrieved from the Internet: URL: <www.fdic.gov/regulations/laws/rules/4000-8240.html>, 2 pages.
FDIC, FDIC Law, Regulations, Related Acts—4000—Advisory Opinions, Jul. 23, 1986, D. H. Jones [online] [Retrieved on Jan. 22, 2010]. Retrieved from the Internet: URL: <www.fdic.gov/regulations/laws/rules/4000-2120.html#fdic400086-21>, 2 pages.
Merrill Lynch—Pierce, Fenner & Smith, Inc., "The Merrill Lynch Cash Management Account®," Financial Service, Jan. 1985, 18 pages.
Merrill Lynch, "Insured Savings™ Account Fact Sheet," The Merrill Lynch Cash Management Account® Financial Service, 11 pages.

CMA, "A Guide to Your CMA Account," Jan. 1995, 38 pages.
American Banker, Salomon's Sweep Plan Raises FDIC Fund Alarm [online], Dec. 6, 2000 [retrieved on Apr. 13, 2009]. Retrieved form the Internet: <URL: http://www.americanbanker.com/printthis.html?id=2000120603YJGEZD>, 2 pages.
The Insured Deposit Account: "Money in the Bank," p. 5; Three Little Letters. Three Big Ways to Save in 1998, p. 4.
LexisNexis, The American Banker, Sep. 23, 1983, Merrill Joins Money Market Account, CMA; Broker Begins Testing With 12 Institutions, Byline: A. Arvan, 4 pages.
Merrill Lynch & Co Inc—MER, 10k Wizard, Form 8-K, "Report of Unscheduled Material Events or Corporate Changes," filed Mar. 7, 2002, 51 pages.
Federal Reserve System, Lexsee 51 FR 9632, "Definition of Deposit and Technical Amendments," Action: Final Rule, Mar. 20, 1986, 13 pages.
Federal Reserve System, Lexsee 56 FR 15494, "Regulation D—Reserve Requirements of Depository Institutions," Action: Final Rule, Apr. 17, 1991, 5 pages.
Federal Reserve System, Part 201—Reserve Requirements of Depository Institutions (Regulation D)12 CFR Ch. II(Jan. 1, 2010 Edition), pp. 94-128, Pt. 204-Pt. 205.
Letter to G.T. Schwartz, from O.I. Ireland, dated Jun. 22, 1988, Re: response to letter of Dec. 18, 1987 regarding proposed modifications to Merrill Lynch's CMA Program, 5 pages.
Federal Reserve System, Lexsee 47 FR 55207, "Reserve Requirements of Depository Institutions; Money Market Deposit Account," Dec. 8, 1982, Action: Final Rule, 5 pages.
Insured Bank Deposits™ Program Summary Information Statement, 11 pages.
Insured Bank Deposits™ Program Information Statement, (attached List of Eligible Program Banks, Effective May 9, 2002; New Account Application, Joint Account Agreement), 11 pages.
Wayne Hummer Investments, "Insured Bank Deposits™ Program, Frequently Asked Questions," 4 pages.
American Express—Meeting Notes Sep. 26, 2000, 2 pages.
American Express Conference Call Minutes, Jan. 25, 2001 @ 3:00pm-4:00pm, Topic: Tiered Balances, 2 pages.
Memorandum to M. Peterson, J. Whitt, R. Wroten, E. Naumes, E. Deal, B. McCain, from J.E. Oncken, Jun. 15, 1990, Re: Insured Savings Update (with attachments), 7 pages.
Insured Savings, "Correspondent Agreement," including Exhibits A-D, 28 pages.
Insured Savings, "Project Team Meeting," Feb. 2, 1989, 21 pages.
Insured Savings, "Overview & Marketing Plan," Presented by: J.E. Oncken, Dec. 6, 1988, (including Exhibit A), 23 pages.
Letter to V.J. Best, from J.E. Oncken, dated Apr. 18, 1988, 2 pages.
Letter to M.L. Duke from K. Johnson, dated Dec. 27, 1989, (attached Insured Savings Correspondent Agreement, Exhibits A-D, letter to M.L. Duke from K. Johnson dated Nov. 21, 1989 and Account Information Sheet), 39 pages.
Memorandum to J. Oncken, J. Scurlock, B. Standefer, E. Piner, T. Cyr, from K. Johnson, dated Jul. 5, 1990, Re: Attached Insured Savings Letters (with attachments), 9 pages.
E.D.S.—First City Austin Electronic Mail, from J. Oncken, to T. Cyr, Re: Depository Levels at Insured Savings Depositories, Nov. 2, 1989, 1 page.
Cash Management Balance Monitoring Agreement and Memorandum from Ed Piner to Cash management Line of Business Representatives dated May 21, 1991(with attachments), 8 pages.
Merrill Lynch, Insured Savings Account Fact Sheet, The Merrill Lynch Cash Management Account® Financial Service, Jan. 1986, 4 pages.
Merrill Lynch Money Markets, Inc., Merrill Lynch Capital Markets, "The Insured Savings Account, Issuer Guide to Offering MMDAs through Merrill Lynch," Sep. 1986; 36 pages.
Merrill Lynch, The Merrill Lynch Capital Builder$^{SM}$ Account Financial Service, Insured Savings$^{SM}$ Account Participating Depository Institutions, 1996, 2 pages.
Insured Deposit Account, May 21, 1996, 14 pages.
An Introduction to the Smith Barney Insured Deposit Account, 8 pages.
Smith Barney Inc. Capital Markets, Debt Origination Group Memo, to J. Mandelbaum, from T. Hamilton, cc: R. Holloman, H. Bald, S. Becton, Re: Insured Deposit Account, Oct. 10, 1995; Smith Barney Inc. Capital Markets, Debt Origination Group Memo, to B. Holloman, from T. Hamilton, cc: W. Heinzerling, H. Morris, COPs, Re: New Product Proposal for Insured Deposit Account, Sep. 18, 1995, 2 pages.
Insured Deposit Account, Product Description for the Investor, Draft as of Sep. 20, 1995, 8 pages.
*Island Intellectual Property LLC et al. v. Deutsche Bank AG, et al.*; Memorandum and Order; Case 1:09-cv-02675-KBF; Doc. 289; Feb. 14, 2012; pp. 1-28.
U.S. Appl. No. 12/453,390, filed May 8, 2009, Bruce Bent.
*Island Intellectual Property LLC et al. v. Deutsche Bank AG, et al.*; Order; Case 1:09-cv-02675-KBS; Doc. 221; Feb. 14, 2012; pp. 1-34.
*Island Intellectual Property LLC et al. v. Deutsche Bank Trust Company Americas, et al.*; Declaration of Charles R. Macedo 2 in support of Plaintiffs' motions in limine Nos. 4-6; Case 1:09-cv-02675-KBF; Doc. 260; Feb. 3, 2012; pp. 1-3 and Exhibits.
*Island Intellectual Property LLC et al. v. Deutsche Bank Trust Company Americas, et al.*; Defendants' opposition to Plaintiffs' motion in limine #3 to preclude defendants' expert Richard T. Powers from testifying that the Merrill Lynch CMA/ISA product includes omnibus accounts. Case 1:09-cv-02675-KBF; Doc. 269; Feb. 6, 2012; pp. 1-18.
*Island Intellectual Property LLC et al. v. Deutsche Bank Trust Company Americas, et al.*; Defendants' opposition to Plaintiffs' motion in limine #4 to preclude evidence and argument regarding Plaintiffs' confidential Oct. 18, 2000 presentation to American Enterprises Investment Services at trial; Case 1:09-cv-02675-KBF; Doc. 284; Feb. 10, 2012; pp. 1-12.
*Island Intellectual Property LLC et al. v. Deutsche Bank Trust Company Americas, et al.*; Memorandum and Order; Case 1:09-cv-02675-KBF; Doc. 265; Feb. 6, 2012; pp. 1-22.
*Island Intellectual Property LLC et al. v. Deutsche Bank Trust Company Americas, et al.*; Plaintiffs' brief in support of their motion in limine #3 to preclude defendants' expert Richard T. Powers from testifying that the Merrill Lynch CMA/ISA product includes omnibus accounts based on 17-year old double hearsay that is uncorroborated and in contravention of documentary and oral evidence of record; Case 1:09-cv-02675-KBF; Doc. 247; Jan. 30, 2012; pp. 1-20.
*Island Intellectual Property LLC et al. v. Deutsche Bank Trust Company Americas, et al.*; Plaintiffs' memorandum of law in support of motion in limine #4 to preclude evidence and argument regarding Plaintiffs' confidential Oct. 18, 2000 presentation to American Enterprises Investment Services at trial; Case 1:09-cv-02675-KBF; Doc. 262; Feb. 6, 2012; pp. 1-10.
*Island Intellectual Property LLC et al. v. Deutsche Bank Trust Company Americas, et al.*; Plaintiffs' motion in limine #4 to preclude evidence and argument regarding Plaintiffs' confidential Oct. 18, 2000 presentation to American Enterprises Investment Services at trial; Case 1:09-cv-02675-KBF; Doc. 257; Feb. 3, 2012; pp. 1-10.
*Island Intellectual Property LLC et al. v. Deutsche Bank Trust Company Americas, et al.*; Plaintiffs' Notice of Motion and Motion in Limine #3 to preclude Defendants' expert Richard T. Powers from testifying that the Merrill Lynch CMA/ISA product includes omnibus accounts based on 17-year old double hearsay that is uncoroborated and in contravention of documentary and oral evidence of record; Case 1:09-cv-02675-KBF, Doc. 246; Jan. 30, 2012; pp. 1-2.
*Island Intellectual Property LLC et al. v. Deutsche Bank Trust Company Americas, et al.*; Plaintiffs' notice of motion and motion in limine #3 to preclude testimony of Gilbert Schwartz; Case 1:09-cv-02675-KBF; Doc. 259; Feb. 3, 2012; pp. 1-2.
*Island Intellectual Property LLC et al. v. Deutsche Bank Trust Company Americas, et al.*; Plaintiffs' notice of motion and motion in limine #4 to preclude evidence and argument regarding Plaintiffs' confidential Oct. 18. 2000 presentation to American Enterprises Investment Services at trial; Case 1:09-cv-02675-KBF; Doc. 256; Feb. 3, 2012; pp. 1-2.
Knight-Ridder; Money Matters, Tips you can use—Limits Apply as FDIC Insurance Covers Depositor, Not Account; Chicago Tribune; Feb. 4, 1998; 2 pages.

Lawsuit by *Island Intellectual Property LLC et al. v. Deutsche Bank Trust Company Americas et al.*; Joint Statement of Claims and Defenses to be Presented at Trial Set for Feb. 27, 2012; Jan. 16, 2012; Case 1:09-cv-02675-KBF (Document 227).

Lawsuit by *Island Intellectual Property LLC v. Clearview Correspondent Services, LLC, et al.*; Branch Banking & Trust Company's Answer to Complaint and Counterclaims; Civil Acion No. 1:11-cv-448-LO-IDD; Jun. 20, 2011; 13 pages.

Lawsuit by *Island Intellectual Property LLC, et al. v. Deutsche Bank Trust Company Americas et al.*; Declaration of Olivia M. Kim in Support of Defendants' Motion for Summary Judgement of Invalidity Under 35 U.S. C. § 101; Oct. 6, 2011; Case 1:09-cv-02675-VM, Document 197.

Lawsuit by *Island Intellectual Property LLC, et al. v. Deutsche Bank Trust Company Americas, et al.* Plaintiffs' Memorandum of Law in Opposition to Defendants' Motion for Summary Judgement fo Invalidity Under 35 U.S.C. § 101; Nov. 2, 2011: Case 1:09-cv-02675-VM, Document 201.

Lawsuit by *Island Intellectual Property LLC, et al. v. Deutsche Bank Trust Company Americas, et al.*; Defendants Reply in Support of Their Motion for Summary Judgement of Invalidity Under 35 U.S.C. § 101; Nov. 15, 2011; Case 1:09-cv-02675-VM, Document 208.

Lawsuit by *Island Intellectual Property LLC, et al. v. Deutsche Bank Trust Company Americas. et al.*; Defendants' Response to Plaintiffs' Statement of Additional Material Facts in Support of Plaintiffs' Opposition to Defendants' Motion for Summary Judgement of Invalidity Under 35 U.S.C. § 101; Nov. 15, 2011; Case 1:09-cv-02675-VM, Document 209.

Lawsuit by *Island Intellectual Property LLC, et al. v. Deutsche Bank Trust Company Americas, et al.*; Order; Dec. 7, 2011; Case 1:09-cv-02675-VM, Document 212.

Lawsuit by *Island Intellectual Property LLC, et al. v. Deutsche Bank Trust Company Americas, et al.*; Special Master's report and Recommended Decision on Defendants' Summary Judgement Motion of Invalidity Under 35 U.S.C. § 101; Dec. 19, 2011.

Lawsuit by *Island Intellectual Property LLC, et al. v. Deutsche Bank Trust Company Americas. et al.*; Supplemental Declaration of Olivia M. Kim in Support of Defendants'Opening and Reply Claim Construction Briefs; Nov. 15, 2011; Case Llc, et al. v. Deutsche Bank Trust Company Americas, et al.; M. Kim1:09-cv-02675-VM, Document 207.

Martnes, Don W.; letter to Hon. Victor Marrero re. supplement to letter of Nov. 28, 2011 on tentative rulings on claim constuction in *Island Intellectual Property LLC et al. v. Deutsche Bank Trust Co., et al.*; Nov. 28, 2011; Case 1:09-cv-02675-VM; Document 211.

Martens, Don W.; letter to Hon. Victor Marrero re. tentative rulings on claim construction in *Island Intellectual Property LLC et al. v. Deutsche Bank Trust Co., et al.*; Nov. 28, 2011; Case 1:09-cv-02675-VM, Document 210.

Scottrade Bank Deposit Program—Terms, Conditions & Disclosures; Author unknown; 8-11; pp. 1-3.

Anderson et al. "Retail Sweep Programs and Bank Reserves," Federal Reserve Bank of St. Louis Review, Bell & Howell Information and Learning Company, vol. 83, Issue 1, 24 Sheets, Jan. 1, 2001.

Bent, "Bruce Bent Makes Money Market Funds Act Like Bank Accounts," Equity BBDP, Oct. 5, 1998, 3 Sheets.

Declaration of Mr. Bruce Bent II, Vice Chairman and Registrant of Applicant on the date of first commercial use of the service providing interest and FDIC insurance for checking accounts by means of a system using money market deposit accounts (MMDA's) of Oct. 23, 1997.

Britt, "Struggling with Sweep Accounts," America's Community Banker, vol. 6, No. 12, 11 Sheets, Dec. 1, 1997.

Chapelle, "Merrill's Rivals Say They, Too. Offer Services Beyond Banking," Securities Data Publishing on Wall Street, 2 Sheets, Feb. 1, 2003.

Chapelle et al. "Peering Into Tomorrow: At the Threshold of a New Century, Brokers and Others Discuss Where They were Going," Securities Data Publishing on Wall Street, 6 Sheets, Dec. 1, 1999.

Coyle, "A Look at commercial Demand Deposit Options," America's Community Banker, vol. 9, Issue 2, Bell & Howell Information and Learning Company, 9 Sheets, Feb. 1, 2000.

Crockett, "Big Banks Found Stepping Up Marketing of 'Sweep' Accounts," American Banker, vol. 159, No. 198, American Banker Inc., 3 Sheets, Oct. 13, 1994.

Fredrickson, "Rising Rates Rescue Money Fund Firm Reserve Profits by Picking Niches," Crain's New York Business, Crain Communications Inc., vol. 20, Issue 51, 2 Sheets, Dec. 20, 2004.

Hoffman, "Reserve's FDIC-Insured Account Draws Regionals; But some see little need for insurance," Crain Communications Inc., Investment News, 2 Sheets, Jun. 4, 2001.

Keenan, "Tapping Brokerages for Alternative to CDs," American Banker, The Financial Services Daily, 3 Sheets, Feb. 18, 2004.

Lavine, "Check Out High-Yield Checking Accounts," Broward Daily Business Review, vol. 39, No. 102, 2 Sheets, Apr. 27, 1998.

McReynolds, "The Power of CASH: Ho-hum cash can be great product (and lead to more business) in troubled times," Securities Data Publishing on Wall Street, 3 Sheets, Jun. 1, 2002.

McReynolds et al. "Unusual Products for Unusual Times," Securities Data Publishing on Wall Street, 6 Sheets, May 1, 2001.

Potter, "As Sweep Accounts Continue to Grow, So do Community Bank Options," America's Community Banker, vol. 9, Issue 8, Bell & Howell Information and Learning Company, 3 Sheets, Aug. 1, 2000.

SHARE, "New Service Skirts FDIC's $100K Limit," Dialog Web Command Mode, 2 Sheets, Jun. 13, 2003, http://www.dialogweb.com/cgi/dwclient.

Smith, "IBAA Won't Push Interest-Bearing Checking For Business; Says Too Few Members Want It," The American Banker, 2 Sheets, Apr. 18, 1996.

Stafford, "New Bank Program Allows $1 Million in Insured Deposits," Dialog Web Command Mode, 3 Sheets, Aug. 24, 2003 http://www.dialogweb.com/cgi/dwclient.

Wilson, "How Cash Management Services Can Help Your Bank Cultivate New Relationships with Commercial Customers," America's Community Banker, vol. 10, Issue 5, Bell & Howell Information and Learning Company, 8 Sheets, May 1, 2001.

"Man Bites Dog: Funds Move Into Banking," IBC's Money Fund Selector, 2 Sheets, Nov. 6, 1998.

About iMoneyNet, Inc., About iMoneyNet's Money Funds Division, 4 Sheets, Aug. 21, 2003, http://www.ibcdata.com/about.htm.

"Reverse Ups Insurance Limit On Money Market Account," Thomson Financial Inc., Mutual Fund Market News, 1 Sheet, Aug. 26, 2002.

"The Reverse Funds to Offer up to $600,000 of FDIC Insurance on Reserve Insured Deposits; Addressing Investor Needs for Increased Safety, Flexibility and a Competitive Yield," Business Wire, Inc. Business Wire, 2 Sheets, Aug. 13, 2002.

"The Bank of New York adds a $300,000 FDIC-Insured Money Market Account Option to its Dividend Income Checking Account," PR Newswire Associations, Inc., PR Newswire, 2 Sheets, Apr. 18, 2002.

The Reserve Fund, Study of U.S. Patent No. 6,374,231, 1 Sheet.

"Bank of Oak Ridge to Offer FDIC Insurance on up to $1.5 Million," Dialog Web Command Mode, 2 Sheets, Sep. 25, 2003, http://www.dialogweb.com/cgi/dwclient.

Reserve Management Corporation, Reserve Insured Deposits, U.S. Appl. No. 76/315,600, Issued.

The Reserve, "What Sets Us Apart," 2 Sheets, Oct. 4, 2006, http://www.ther.com/bank/bank_wsua.shtml.

The Reserve, "Reserve Insured Deposits," 2 Sheets, Oct. 4, 2006, http://www.ther.com/ps/ps_fif.shtml.

The Reserve, "Company History," 3 Sheets, Oct. 4, 2006, http://www.ther.com/aboutus/history.shtml.

The Reserve, "Reserve Insured Deposits Program," 2 Sheets, Oct. 4, 2006, http://www.ther.com/bank/bank_insdep.shtml.

Reserve Insured Deposits, United States Patent and Trademark Office, Reg. No. 2,694,910, Registered Mar. 11, 2003, 1 Sheet.

Mutual Funds Magazine, Bargain Basement Funds, Oct. 1997, 2 Sheets.

Mutual Funds Magazine, Bargain Basement Funds, Oct. 1997, 1 Sheet.

Money Fund Report, IBC Financial Data, Inc., Nov. 6, 1998, 1 Sheet.

Liberman et al., Market Watch, "How Important are Banks?" FDIC Insurance on Deposits Just One Continuing Advantage, Oct. 17, 2006, 3 Sheets.

DI 48, Excerpts of Transcript of Hearing, U.S. Dist. Ct., District of Delaware, Civil Action No. 82-680, Apr. 8, 1983, 5 sheets.
DI 56, Interrog. Response, U.S. Dist. Ct. District of Delaware, Civil Action No. 82-680, May 20, 1983, 15 Sheets.
DI 99, Suppl. Interrogatory Response, U.S. Dist. Ct., District of Delaware, Civil Action No. 82-630, May 30, 1984, 6 Sheets.
Letter from Michael Bradfield, General Counsel, Board of Governors of the Federal Reserve System, Nov. 16, 1984, 4 Sheets.
Board of Governors of the Federal Reserve System, 1984 Fed. Res. Interp. Ltr. LEXIS 56, Nov. 16, 1984, 3 Sheets.
Letter From Oliver I. Ireland, Associate General Counsel, Board of Governors of the Federal Reserve System, Jun. 22, 1988, 5 Sheets.
Board of Governors of the Federal Reserve System, 1988 Fed. Res. Interp. Ltr. LEXIS 141, Jun. 22, 1988, 3 Sheets.
Board of Governors of the Federal Reserve System, 1989 Fed. Res. Interp. Ltr. LEXIS 77, Mar. 14, 1989, 2 Sheets.
Board of Governors of the Federal Reserve System, 1989 Fed. Res. Interp. Ltr. LEXIS 154, Jun. 21, 1989, 2 Sheets.
Board of Governors of the Federal Reserve System, 1990 Fed. Res. Interp. Ltr. LEXIS 94, Feb. 1, 1990, 1 Sheet.
Board of Governors of the Federal Reserve System, 1991 Fed. Res. Interp. Ltr. LEXIS 232, Jan. 30, 1991, 2 Sheets.
CMA, The Merrill Lynch Cash Management Account Financial Service, Insured Savings Account Participating Depository Institutions, Merrill Lynch, Pierce, Fenner & Smith Incorporated, Nov. 1992, 2 Sheets.
Board of Governors of the Federal Reserve System, 1994 Fed. Res. Interp. Ltr. LEXIS 156, Jun. 24, 1994, 3 Sheets.
CMA, Insured Savings Account Fact Sheet, Merrill Lynch, Pierce, Fenner & Smith Incorporated, Jul. 1994, pp. 47-54.
Board of Governors of the Federal Reserve System, 1994 Fed. Res. Interp. Ltr. LEXIS 314, Oct. 17, 1994, 2 Sheets.
Board of Governors of the Federal Reserve System, 1994 Fed. Res. Interp. Ltr. LEXIS 419, Oct. 14, 1994, 4 Sheets.
CMA, The Merrill Lynch Cash Management Account Financial Service, Insured Savings Account Participating Depository Institutions, Merrill Lynch, Pierce, Fenner & Smith Incorporated, Mar. 1995, 2 Sheets.
Letter from Stephanie Martin, Assoc. General Counsel, Board of Governors of the Federal Reserve System, Apr. 22, 2004, 8 Sheets.
Bank Deposit Program, Online http://web.archive.org/web/20030620100115/http:/www.smithbarney.com/products_servi, Jan. 19, 2001, 4 Sheets.
Lawsuit by Island Intellectual Property LLC, Lids Capital LLC, and Double Rock Corporation against Promontory Interfinancial Network, LLC and MBSC Securities Corporation, including Cover Sheet, Summons, Complaint and Rule 7.1 Statement, Mar. 24, 2009, Case No. 09 CV 2675.
Lawsuit by Island Intellectual Property LLC, Lids Capital LLC, and Double Rock Corporation against Deutsche Bank AG, Deutsche Bank Trust Company Americas and Total Bank Solutions, LLC, including Cover Sheet, Summons, Complaint and Rule 7.1 Statement, Mar. 24, 2009, Case No. 09 CV 2677.
Lawsuit by Promontory Interfinancial Network, LLC against Double Rock Corporation p/k/a Reserve Management Corporation, Complaint, Mar. 24, 2009, Civil Action No. 1:09 CV 316.
Lawsuit by Promontory Interfinancial Network, LLC against Double Rock Corporation p/k/a Reserve Management Corporation and Lids Capital LLC, Amended Complaint, Mar. 27, 2009, Civil Action No. 1:09 CV 316.
Lawsuit by Island Intellectual Property LLC, Lids Capital. LLC, Double Rock Corporation and Intrasweep LLC, against Promontory Interfinancial Network, LLC, Deutsche Bank AG, Deutsche Bank Trust Company Americas and Total Bank Solutions, LLC, Complaint, Apr. 14, 2009, Case No. 09 CV 3750.
Lawsuit by Promontory Inter-financial Network, LLC against Double Rock Corporation, p/k/a Reserve Management Corporation, Island Intellectual Property LLC and Lids Capital LLC, including Cover Sheet, Summons and Complaint, Apr. 14, 2009, Civil Action No. 3:09 CV 217.
Lawsuit by Promontory Interfinancial Network, LLC against Double Rock Corporation p/k/a Reserve Management Corporation, Island Intellectual Property LLC, Lids Capital LLC and Intrasweep LLC, Amended Complaint, Apr. 15, 2009, Civil Action No. 3:09 CV 217.
12 CFR Part 329—Interest on Deposit, Source 51 FR 10808, Mar. 31, 1986, 5 Sheets.
AB 2011 Assembly Bill—Bill Analysis, Senate Amendments, http://www.leginfo.ca.gov/pub/bill/asm/ab_2001-2050/ab_2011_cfa_20060811_161755_asm_floor.html, 2006, pp. 1-3.
AB 2011 Assembly Bill—Bill Analysis, Senate Rules Committee, Third Reading, http://www.leginfo.ca.gov/pub/bill/asm/ab_2001-2050/ab_2011_cfa_20060705_161454_sen_floor.html, 2006, pp. 1-7.
AB 2011 Assembly Bill—Chaptered, http://www.leginfo.ca.gov/pub/bill/asm/ab_2001-2050/ab_2011_bill_20060925_chaptered.html, 2008, pp. 1-3.
AB 2011 Assembly Bill—Enrolled, http://www.leginfo.ca.gov/pub/bill/asm/ab_2001-2050/ab_2011_bill_20060816_enrolled.html, 2006, pp. 1-3.
AB 2011 Assembly Bill—History, Complete Bill History, http://www.leginfo.ca.gov/pub/bill/asm/ab_2001-2050/ab_2011_bill_20060925_history.html, 2006, p. 1.
Announcing Changes in Automatic "Sweep" Investment Options, LPL Financial Services, Linsco/Private Ledger, Member NASD/SIPC, 26 Sheets.
California Independent Bankers, ICBA Independent Community Bankers of America, Banker Bulletin, 2006, CIB 16th Annual Convention, vol. 4, issue 6, http://www.cib.org/banker_bulletin.htm.
Capital Briefs: Corporate Checking Account Relief Sought, American Banker, vol. 162, Jul. 28, 1997, 1 Sheet.
CMA, Insured Savings Account Fact Sheet, Merrill Lynch, Pierce, Fenner & Smith Incorporated, 1997, pp. 49-57.
CMA, The Investor Credit Line Service, Cost-Effective Financing for the '90s, Merrill Lynch, Pierce, Fenner & Smith Incorporated, 1997, pp. 36-46.
CMA, The Merrill Lynch Cash Management Account Financial Service, Merrill Lynch, Pierce, Fenner & Smith Incorporated, Jan. 1997, 35 Sheets.
Deposit Growth Strategies For Financial Institutions, New Sweep Account Helps Retain $40 Million in Business Deposits, vol. 7, No. 12, The Reserve Funds, May 2001, 1 Sheet.
FDIC Federal Register Citations: Email from Bert Ely to Comments, Mar. 8, 2006, Subject: Large-Bank Deposit Insurance Determination Proposal—RIN 3064-AC98—Regs@fdic.gov. Attached, also from FDIC Federal Register Citations: Email From American Banker, by Bert Ely, Feb. 24, 2006, Viewpoint: FDIC's Account-Link Plan a Pointless, Costly Threat.
FDIC, Federal Deposit Insurance Corporation, Letter to Mr. Ronald Rexter, Feb. 28, 2003, From Michelle M. Borzillo, Counsel Supervision and Legislation Section, 2 Sheets.
Financial Services Industry, "Web Watch: Trading Company Bundles CDs for Better Rates," Community Banker, Jun. 2002, online, http://findarticles.com/p/articles/mi_qa5344/is_200206/ai_n21313883/.
FINISTAR, Providing FDIC Insured Funds as a Stable Source of Deposits to Commercial Banking Institutions, 16 Sheets, www.Finistar.com.
Frost Bank, Member FDIC, Checking Accounts, 1 Sheet, Sep. 19, 2003, https://www.frostbank.com/cgi-bin/ecomm/frost1/scripts/products/product_detail.jsp?BV_.
Insured Cash Account Program Disclosure Booklet, LPL Financial Services, Linsco/Private Ledger, Member NASD/SIPC, 14 Sheets.
In The Know, Important Information About Your Account, Smith Barney Citigroup, 2005, 6 Sheets.
Letter From Joseph A. DiNuzzo, Counsel, Oct. 20, 1999, FDIC, Federal Deposit Insurance Corporation, 1 Sheet.
Letter From Roger A. Hood, Assistant General Counsel, Jul. 16, 1986, FDIC, Federal Deposit Insurance Corporation, Legal Division, 1 Sheet.
Letter From Jamey Basham, Attorney, LEXSEE 1990 FDIC Interp. Ltr., Lexis 1, Federal Deposit Insurance Corporation, FDIC-90-02, Jan. 3, 1990, 2 Sheets.
Letter From Merle Y. Waldman, LEXSEE 1985 Sec No- Act., Lexis 1593, Securities Exchange Act of 1934—Section 15(a), Jan. 8, 1985, 11 Sheets.

Letter to Mr. James E. Creekman, Group Vice President, From Oliver Ireland, Associate General Counsel, Aug. 1, 1995, 4 Sheets.
Letter to Mr. Jonathan L. Levin, Esq., From Oliver Ireland, Associate General Counsel, Oct. 18, 1996, 2 Sheets.
Letter to Mr. L.P. Fleming, Jr., Esq., From Oliver Ireland, Associate General Counsel, Feb. 7, 1995, 3 Sheets.
Letter to Ms. Brenda L. Skidmore, Senior Vice President, From Oliver Ireland, Associate General Counsel, Aug. 30, 1995, 4 Sheets.
Merriam-Webster Online Dictionary, 10th Edition, Definition of "Associated", 2 Sheets.
Merrill Lynch Announces Beyond Banking, The Power of Advice For Smarter Cash Management, Jan. 8, 2 Sheets.
Merrill Moves CMA Cash to Bank, Street Talk, On Wall Street, Nov. 2000, p. 26.
Merrill Lynch & You, Jan. 2000, "Financial Services The Way You Want, When You Want Them," 4 Sheets.
Merrill Lynch, Pierce, Fenner & Smith Incorporated, "Information Statement," 2000, 12 Sheets.
Money Fund Report, Bank of New York Adds Insured Sweeps Option, Friday, May 3, 2002, The Reserve Funds, 1 Sheet.
Money Fund Report, Insured Cash Sweep Options Proliferate, Friday, Jun. 1, 2001, The Reserve Funds, 1 Sheet.
Money Market Insight's, Goldman Sachs May Create Bank to Offer Insured Cash Sweeps, Aug. 2002 Issue, 3 Sheets.
Munk, Merrill Makes New Push Into Traditional Banking, Dow Jones Newswires, Jan. 3, 2003, 1 Sheet.
O'Brian, "Money-Market Funds Suit Many Investors, But Proud Creator Frets About Extra Risk," Re-Printed From The Wall Street Journal, Monday, Nov. 6, 2000, Dow Jones & Company, Inc., 2 Sheets.
On Wall Street, Helping Brokers Build A More Successful Business, The Power of CASH, Jun. 2002, 2 Sheets.
On Wall Street, Helping Brokers Build A More Successful Business, Unusual Products For Unusual Times, May 2001, 2 Sheets.
Online, www.usabancshares.com, Brave New World, 1999, 2 Sheets.
Part: 2, Monetary Policy and Reserve Requirements, Subpart—Regulation D, Board Interpretations of Regulation D, Transaction Accounts—Linked to Time Deposits, vol. 1, Federal Reserve Regulatory Service, 2 Sheets.
RING, National/Global, "Amex Spans The Globe in Retail Bank Buildup," Nov. 27, 2000, 1 Sheet.
Sweeping Your Firm Into FDIC Insured Deposits, Harken Financial Services, Aug. 4, 2006, 8 Sheets.
Testimony of Bruce R. Bent, CEO of The Reserve Funds, Before The Financial Institutions and Consumer Credit Subcommittee House Financial Services Committee U.S. House of Representative, Hearing on H.R. 758 and H.R. 859, Mar. 5, 2003, 4 Sheets.
The Depository Trust Company, B#: 3875, Oct. 1, 2002, Settlement\Underwriting, From: Denise Russo, Director, Underwriting, 6 Sheets.
The Insured Savings Account, Issuer Guide to Offering MMDAs Through Merrill Lynch, Merrill Lynch Money Markets, Inc., "Operational Guide to the Merrill Lynch MMDA Program 1986", Sep. 1986 3 Sheets.
The Reserve Funds, NJBA Endorses New Sweep Account Offers New Jersey Banks Deposit Growth, Retention, for Immediate Release, May 23, 2001, 1 Sheet.
The Reserve Funds, Objectives, Observations & Strategies for American Enterprises Inv., Oct. 18, 2000, 11 Sheets.
The Reserve Funds Press Release, "The Reserve Funds and Frontier Bank Partner to Offer Revolutionary Banking Product," 5 Sheets, Aug. 1, 2000.
The Reserve Funds, Reserve Management and Irwin Union Bank and Trust Company Partner to Offer the Reserve Return Sweep, For Immediate Release, Mar. 8, 2001, 2 Sheets.
The Unmatched Sweep Solution From The Cash Management Expert, 2 Sheets.
Waddell, "Sweeping Clean," Advisor, The Advisor to Advisors, 2 Sheets.
Lawsuit by Island Intellectual Property LLC, Intrasweep LLC and Double Rock Corporation against Deutsche Bank AG, Deutsche Bank Trust Company Americas and Total Bank Solutions, LLC, Complaint for Patent Infringement, May 19, 2009, Case No. 09 CIV 4673.
Lawsuit by Promontory Interfinancial Network, LLC against Double Rock Corporation p/k/a Reserve Management Corporation, Island Intellectual Property LLC, Lids Capital LLC and Intrasweep LLC, Complaint, May 19, 2009, Civil Action No. 3:09 CV 322.
Lake Forest Bank & Trust Company, Introducing MaxSafe Deposit Accounts with up to $3.75 Million in FDIC Insurance, www.lakeforestbank.com/maxsafe, 2 Sheets.
Seven Times the Security of a Normal CD, Introducing our MaxSafe CD, 4 Sheets.
Introducing our MaxSafe CD with up to $700,000 of FDIC Insurance, 4 Sheets.
U.S. Appl. No. 09/677,535, filed Oct. 2, 2000, Bruce Bent et al.
U.S. Appl. No. 10/825,440, filed Apr. 14, 2004, Bruce Bent et al.
U.S. Appl. No. 11/641,046, filed Dec. 19, 2006, Bruce Bent et al.
U.S. Appl. No. 11/840,052, filed Aug. 16, 2007, Bruce Bent et al.
U.S. Appl. No. 11/840,060, filed Aug. 16, 2007, Bruce Bent et al.
U.S. Appl. No. 12/385,522, filed Apr. 10, 2009, Bruce Bent et al.
U.S. Appl. No. 12/408,507, filed Mar. 20, 2009, Bruce Bent et al.
U.S. Appl. No. 12/408,511, filed Mar. 20, 2009, Bruce Bent et al.
U.S. Appl. No. 12/408,523, filed Mar. 20, 2009, Bruce Bent et al.
U.S. Appl. No. 12/453,387, filed May 8, 2009, Bruce Bent et al.
U.S. Appl. No. 12/453,388, filed May 8, 2009, Bruce Bent et al.
U.S. Appl. No. 12/453,389, filed May 8, 2009, Bruce Bent et al.
U.S. Appl. No. 12/453,390, filed May 8, 2009, Bruce Bent et al.
Financial Transactions and Reports Analysis Centre of Canada, 1 page, (http://www.fintrac-canafe.gc.ca/inro-eng.asp.
Finistar Reg. No. 2,939,558, Registered Apr. 12, 2005.
FINTRAC's Guidelines, 1 page, (http://www.fintrac.gc.ca/publications/guide/guide-eng.asp).
Garmhausen, "Matching Small Banks with Large Muni Deposits," American Banker, Online The Financial Services Resource, Oct. 4, 2005, 4 pages, http://www.finstar.com/docs/AmericanBanker.html.
Hencke, "New Rules for FDIC deposit Insurance", ABA Bank Compliance, vol. 20, No. 7, Jul./Aug. 1999, pp. 31-37.
IDC Deposits, online, http://idcdeposits.com/ 1 Sheet.
Jong et al., "The Valuation and Hedging of Variable Rate Savings Accounts," University of Amsterdam, Nov. 15, 2001, 23 Sheets.
Lawsuit by Carlo DeBlasio et al. against Merrill Lynch & Co., Inc. et al., Declaration of Andrew W. Stern, including Exhibits A, B, C, D, E and F, Nov. 11 2007, Case No. 07-cv-318 (RJS) (Document 59).
Lawsuit by Carlo DeBlasio et al. against Merrill Lynch & Co., Inc. et al., Declaration of Joel P. Laitman in Support of Plaintiffs' Memorandum of Law in Opposition to Defendants' Motion For Dismissal of the Second Amended Class Action Complaint, Including: "Client Commitment"; "Get Started Today"; "Total Merrill"; "Guideline For Business Conduct"; "Commitment To Clarity"; "Cash Management Account"; "Information Statement Regarding Changes To Interest Rates On Deposits in Merrill Lynch Banks",.
Lawsuit by Carlo DeBlasio et al. against Merrill Lynch & Co., Inc. et al., Declaration of Joel P. Laitman in Support of Plaintiffs' Memorandum of Law in Opposition to Defendants' Motion For Dismissal of the Second Amended Class Action Complaint, Including: . . . Feb. 5, 2008 (Document 72).
Lawsuit by Carlo DeBlasio et al. against Merrill Lynch & Co., Inc. et al., Declaration of Joel P. Laitman in Support of Plaintiffs' Memorandum of Law in Opposition to Defendants' Motion For Dismissal of the Second Amended Class Action Complaint, Including: . . . Feb. 5, 2008 (Document 73).
Lawsuit by Carlo DeBlasio et al. against Merrill Lynch & Co., Inc. et al., Declaration of Joel P. Laitman in Support of Plaintiffs' Memorandum of Law in Opposition to Defendants' Motion For Dismissal of the Second Amended Class Action Complaint, Including: . . . Feb. 5, 2008 (Document 74).
Lawsuit by Carlo DeBlasio et al. against Merrill Lynch & Co., Inc. et al., Declaration of Joel P. Laitman in Support of Plaintiffs' Memorandum of Law in Opposition to Defendants' Motion For Dismissal of the Second Amended Class Action Complaint, Including: . . . Feb. 5, 2008 (Document 75).

Lawsuit by Carlo DeBlasio at al. against Merrill Lynch & Co., Inc. et al., Declaration of Kenneth I. Schacter, including Exhibits A, B, C, D, F, G, H, I, J, K, L, M, N, O, P, Q and R, Nov. 14 2007, Case No. 07-cv-318 (RJS) (Document 69).

Lawsuit by Carlo DeBlasio et al. against Merrill Lynch & Co., Inc. et al., Declaration of Mathew J. Terry in Support of Motion to Dismiss by Defendants Wachovia Corporation, Wachovia Securities, LLC, Wachovia Bank, N.A., and Wachovia Bank of Delaware, N.A., including Exhibits A, B, C and D, Nov. 14 2007, Case No. 07-318 (RJS) (Document 67).

Lawsuit by Carlo DeBlasio et al. against Merrill Lynch & Co., Inc. et al., Declaration of Scott D. Musoff in Support of The Merrill Lynch Defendants' Motion to Dismiss The Second Amended Class Action Complaint, ECF Case, Nov. 12 2007, Case No. 07-cv-318 (RJS) (Document 64).

Lawsuit by Carlo DeBlasio et al. against Merrill Lynch & Co., inc. et al., Reply Declaration of Kenneth Schacter including Exhibits S and T, Mar. 6, 2008, Case No. 07-cv-318 (RJS) (Document 81).

Lawsuit by Carlo DeBlasio at al. against Merrill Lynch & Co., Inc. et al., Second Amended Class Action Complaint, Jury Trial Demanded, Introduction and Summary of Allegations, Jun. 11, 2007, Case No. 07-cv-318-VM.

Lawsuit by Carlo DeBlasio et al. against Merrill Lynch & Co., Inc. et al., Supplemental Declaration of Matthew J. Terry in Support of Motion to Dismiss by Defendants Wachovia Corp., Wachova Securities, LLC, Wachovia Bank N.A., and Wachovia Bank of Delaware, N.A., including Exhibits A and B, Mar. 6, 2008, Case No. 07-cv-318 (RJS) (Document 79).

Lawsuit by Carlo DeBlasio, et al. against Merrill Lynch & Co., Inc., et al., Opinion and Order Regarding Motions, Jul. 27, 2009, Case No. 07 CIV 318(RJS).

Lawsuit by Island Intellectual Property LLC and Intrasweep LLC against Deutsche Bank Trust Company Americas and Total Bank Solutions, LLC, Deutsche Bank Trust Company Americas' answer to plaintiffs' Feb. 23, 2010 complaint and counterclaims, May 4, 2010, Civil Action No. 09 Civ. 2675 (VM) (AJP)(Document 111).

Lawsuit by Island Intellectual Property LLC and Intrasweep LLC against Deutsche Bank Trust Company Americas and Total Bank Solutions, LLC, Total Bank Solutions, LLC's answer to plaintiffs' Feb. 23, 2010 complaint and counterclaims, May 4, 2010, Civil Action No. 09 Civ. 2675 (VM) (AJP)(Document 112).

Lawsuit by Island Intellectual Property LLC and Intrasweep LLC against Institutional Deposits Corp., Complaint for Patent Infringement, Jury Trial Demanded, Nov. 4, 2009, Civil Action No. 09 CV 3079.

Lawsuit by Island Intellectual Property LLC and Intrasweep LLC against Institutional Deposits Corp., Consent Order, Apr. 21, 2010, Case No. 09-CV-3079 (Document 44).

Lawsuit by Island Intellectual Property LLC and Intrasweep LLC, Answer of Defendant Institutional Deposits Corp. to Complaint for Patent Infringement, Dec. 10, 2009, Case No. 09 CV 03079 (JEC), (Document 16).

Lawsuit by Island Intellectual Property LLC, Lids Capital LLC, Double Rock Corporation and Intrasweep LLC against Deutsche Bank AG, Deutsche Bank Trust Company Americas and Total Bank Solutions, LLC, Stipulated Dismissal of Deutsche Bank AG Without Prejudice, Nov. 19, 2009, Civil Action No. 09 CIV 2675 (VM) (AJP) (Document 79).

Lawsuit by Island Intellectual Property LLC, Lids Capital LLC, Double Rock Corporation and Intrasweep LLC against Deutsche Bank Trust Company Americas and Total Bank Solutions, LLC, Deutsche Bank Trust Company Americas' First Amended Answer to Consolidated First Amended Complaint and Counterclaims, Dec. 4, 2009, Civil Action No. 09 CIV 2675 (VM) (AJP), (Document 86).

Lawsuit by Island Intellectual Property LLC, Lids Capital LLC, Double Rock Corporation and Intrasweep LLC against Deutsche Bank Trust Company Americas and Total Bank Solutions, LLC, Total Bank Solutions, LLC's First Amended Answer to Consolidated First Amended Complaint and Counterclaims Dec. 4, 2009, Civil Action No. 09 CIV 2675 (VM) (AJP) (Document 87).

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Answer and Counter Claims, Answer of Defendant MBSC Securities Corporation., Jun. 25, 2009, Case No. 09 CV 2675.

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Answer and Counter Claims, Answer of Defendant Promontory Interfinancial Network, LLC, Jun. 25, 2009, Case No. 09 CV 2675.

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Consolidated First Amended Complaint, Jury Trial Demanded, Jun. 11 2009, Civil Action No. 09 CIV 2675 (VM).

Lawsuit by Island Intellectual Property LLC, Lids Capital LLC, Double Rock Corporation and Intrasweep LLC against Promontory Interfinancial Network LLC, MBSC Securities Corporation. Deutsche Bank AG, Deutsche Bank Trust Company Americas and Total Bank Solutions, LLC, Jury Trial Demanded, Deutsche Bank AG's Answer To Consolidated First Amended Complaint, Jun. 25, 2009, Civil Action No. 09 CIV 2675.

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Jury Trial Demanded, Deutsche Bank Trust Company Americas' Answer To Consolidated First Amended Complaint and Counter Claims, Jun. 25, 2009, Civil Action No. 09 CIV 2675.

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Jury Trial Demanded, Total Bank Solutions, LLC's Answer T o Consolidated First Amended Clomplaint and Counter Claims, Jun. 25, 2009, Civil Action No. 09 CIV 2675.

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Stipulated Dismissal of Counts I-III of Defendant Promontory Interfinancial Network, LLC's, Counterclaim with Prejudice, Oct. 19, 2009, (Document 68).

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Stipulation and Order, Oct. 29, 2009, Case No. 09 CV 2675 (VM) (AJP) (Document 73).

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, The Island Plaintiffs' Reply to Defendant Deutsche Bank Trust Company Americas' Counterclaims, Jul. 9, 2009, Civil Action No. 09 CIV 2675 (VM).

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, The Island Palintiffs' Reply to Defendant MBSC Securities Corporation's Counterclaims, Jul. 9, 2009, Civil Action NO. 09 CIV 2675 (VM).

Lawsuit by Island Intellectual Property LLC, Lids Captial LLC, Double Rock Corporation and Intrasweep LLC against Promontory Interfinancial Network LLC, MBSC Securitied Corporation, Deutsche Bank AG, Deutsche Bank Trust Company Americas and Total Bank Solutions, LLC, The Island Plaintiffs' Reply to Defendant Promontory Interfinancial Network LLC's Counterclaims, Jul. 9, 2009, Civil Action No. 09 CIV 2675 (VM).
Lawsuit by Island Intellectual Property LLC, Lids Capital LLC, Double Rock Corporation and Intrasweep LLC against Promontory Intel-financial Network LLC, MBSC Securities Corporation, Deutsche Bank AG, Deutsche Bank Trust Company Americas and Total Bank Solutions, LLC, The Island Plaintiffs' Reply to Defendant Total Bank Solutions, LLC's Counterclaims, Jul. 9, 2009, Civil Action No. 09 CIV 2675 (VM).
Letter to William R. Burdette, CEO, Apr. 6, 2009, FDIC, Federal Deposit Insurance Corporation, 2 pages.
Letter to William R. Burdette, CEO, Nov. 15, 2007, FDIC, Federal Deposit Insurance Corporation, 5 Sheets.
Mutual Fund Dealers Association, 1 page, (http://www.mfda.ca/.
Promontory Interfinancial Network, Promontory Interfinancial Network Announces New Deposit Placement Service, Jan. 21, 2003, 3 Sheets.
Promontory Interfinancial Network: http://www.promnetwork.com/index.html, 2003.
The Pershing Press, Dreyfus Insured Deposit Program, Issue 2, Aug. 2008, http://www.pershing.com/news/pershing_press/news_466244.html, 2 Sheets.
Total Bank Solutions, Bank Sweep FAQs, http://www.totalbanksolutions.com/sweepbnkfaqs.htm, Sep. 23, 2005, 2 pages.
Total Bank Solutions, Bank Sweep FAQs, http://www.totalbanksolutions.com/sweepbnkfaqs.htm, Nov. 2, 2005, 3 pages.
Total Bank Solutions, Bank Sweep Products, Deutsche Bank, http://www.totalbanksolutions.com/banksweep.htm, Sep. 23, 2005, 1 page.
Total Bank Solutions, Bank Sweep Products, http://www.totalbanksolutions.com/banksweep.htm, Appendix 3, Oct. 18, 2005, 2 pages.
Total Bank Solutions, Bank Sweep Products, http://www.totalbanksolutions.com/banksweep.htm, Nov. 2, 2005, 2 pages.
Total Bank Solutions, Brokerage Sweep FAQs, http://www.totalbanksolutions.com/brokerfaqs.htm, Nov. 2, 2005, 3 pages.
Total Bank Solutions, Brokerage Sweep, http://www.totalbanksolutions.com/brokersweep.htm, Nov. 2, 2005, 1 page.
Total Bank Solutions, Deposit Bank FAQs, http://www.totalbanksolutions.com/depositbnkfaqs.htm, Nov. 2, 2005, 2 pages.
Total Bank Solutions, Deposits, Deutsche Bank, http://www.totalbanksolutions.com/deposits.htm, Sep. 23, 2005, 1 page.
Total Bank Solutions, Deposits, http://www.totalbanksolutions.com/deposits.htm, Nov. 2, 2005, 2 pages.
Total Bank Solutions, Deutsche Bank Insured Deposit Program, DB Insured Deposit Program Features, http://www.totalbanksolutions.com/features.htm, Sep. 23, 2005, 2 pages.
Total Bank Solutions, Deutsche Bank Insured Deposit Program, http://www.totalbanksolutions.com/, Sep. 23, 2005, 1 page.
Total Bank Solutions, http://www.totalbanksolutions.com/, Mar. 16, 2007, 8 pages.
Total Bank Solutions, http://www.totalbanksolutions.com/overview.htm, Nov. 2, 2005, 1 page.
Total Bank Solutions, Insured Deposit Program Features, http://www.totalbanksolutions.com/features.htm, Nov. 2, 2005, 2 pages.
Total Bank Solutions, Insured Deposit Program, http://www.totalbanksolutions.com/Insureddeposits.htm, Nov. 2, 2005, 2 pages.
Total Bank Solutions, Partners & Affiliates, http://www.totalbanksolutions.com/partners.htm, Nov. 2, 2005, 3 pages.
Total Bank Solutions, Partners & Affiliates, http://www.totalbanksolutions.com/partners.htm, Oct. 25, 2005, 3 pages.
Total Bank Solutions, Strategtic Partners, Nov. 2, 2005, 1 page.
Total Bank Solutions, TBS Deposit Account, About Our Broker Products, http://www.totalbanksolutions.com/brokerproducts.htm, Sep. 7, 2005, 2 pages.
Total Bank Solutions, TBS Management Team, http://www.totalbanksolutions.com/management.htm, Appendix 1, Oct. 18, 2005, 1 page.
Total Bank Solutions, TBS Management Team, http://www.totalbanksolutions.com/management.htm, Nov. 2, 2005, 2 pages.
Total Bank Solutions, TBS Management Team, http://www.totalbanksolutions.com/management.htm, Oct. 25, 2005, 2 pages.
TotalBank Solutions, TBS Bank Deposit Account, Oct. 2004, 6 pgs.
TotalBank Solutions, web.archive.org/web/20050126044216/http://totalbanksolutions.com, Jan. 26, 2005, 2 pgs.
USA Mutual Partners Insured Cash Shelter Account Terms and Conditions, 11 pages, 2009 USA Mutuals Partners, Inc.
Wachovia Securities, Important Information for Clients Concerning Changes in Automatic "Sweep" Arrangements, Oct. 1, 2003, 6 sheets.
Email from Olivia Kim to Charles Macedo on May 13, 2010 with attachment of Lawsuit by Island Intellectual Property LLC, Lids Capital LLC, Double Rock Corporation, and Intrasweep LLC against Deutshe Bank Trust Company Americas and Total Bank Solutions, LLC, Defendant Total Bank Solutions, LLC's responses to Double Rock's Common interrogatory Nos. 1-10 to defendants, Reservation of Right, Civil Action No. 09 Civ. 2675 (VM) (AJP).
Email from Olivia Kim to Charles Macedo on May 13, 2010 with attachment of Lawsuit by Island Intellectual Property LLC, Lids Capital LLC, Double Rock Corporation, and Intrasweep LLC against Deutshe Bank Trust Company Americas and Total Bank Solutions, LLC, Defendant Deutsche Bank Trust Company America's responses to Double Rock's Common interrogatory Nos. 1-10 to defendants Reservation of Right, Civil Action No. 09 Civ. 2675 (VM) (AJP).
Blackwell, "ABA to Approve System for Sharing Deposit Coverage," American Banker, 2 Sheets, Feb. 11, 2003.
Certificate of Deposit Registry Service: Keeping Deposits in the Corn Patch, Banknews, 2 Sheets. Mar. 2003.
Heavyweight Funding, Bankers News, Mar. 4, 2003, vol. II, Issue No. 5, 2 Sheets.
News Article: "Regulators Support Demand Deposit Bill", Regulatory Compliance Watch—Mar. 9, 1998; 2 Sheets, vol. 9, No. 10.
Memorandum from Ken Johnson re: Insured Deposit Products, Aug. 18, 1992, 3 pgs.
Memorandum from John E. Oncken re: Insured Savings Update, Jun. 15, 1990, 7 pgs.
Memorandum from John E. Oncken re: Brokered Deposit Issue vs. Insured Savings, Mar. 22, 1990, 8 pgs.
Memorandum from Ed Piner re: Insured Savings Product Update, Feb. 1, 1990, 4 pgs.
Insured Savings Correspondent Agreement with Exhibits A-D, 28 pgs.
First City, Texas Insured Savings Agency Agreement with Exhibits A-B and Insured Savings Program, 10 pgs.
Insured Savings Project Team Meeting, Feb. 2, 1989, 16 pgs.
Insured Savings Product Description, Product Name: Insured Savings, Product Description: U.S. Patent #4,985,833, 3 pgs.
Letter to Tim C. Lear, Sep. 20, 1988, 1 pg., with Memorandum from Ed Piner, re: Insured Savings Product, Nov. 9, 1988, and Letter from Tara L. Cyr, Dec. 9, 1988, 1 pg.
Automatic Insured Deposit Method, Patent Application Information, Jul. 11, 1988, 17 pgs.
Insured Savings, Overview & Marketing Plan, Dec. 6, 1988, 23 pgs.
Memorandum from Dick Zinser, re: A First City-Austin deposit program to hold existing customers' deposits, Mar. 17, 1988, 7 pgs.
Insured Savings Remote Site Sweep Procedures, 3 pgs.
Letter to Malcolm L. Duke, Dec. 27, 1989 with Insured Savings Correspondent Agreement, Exhibits A-D, and Letter to Malcolm L. Drake, Nov. 21, 1989. 37 pgs.
Memorandum from Ken Johnson, re: Attached Insured Savings Letters, Jul. 5, 1990, 1 pg.
Letter to Jerry Crutsinger, Jul. 3, 1990, 1 pg.
Letter to Bill Goertz, Jul. 3, 1990, 1 pg.
Letter to Susan Goodwin, Jul. 3, 1990, 1 pg.
Insured Savings Rate Change Notice, 1 pg.
Addendum to Insured Savings Agency Agreement, 1 pg.
Letter to Paula Martin, Jul. 3, 1990, 1 pg.
Letter to John Lovell, Jul. 3, 1990, 1 pg.
Insured Savings Balance Limits form, 1 sheet.
Email from John Oncken re: Depository Levels at Insured Savings Depositories, Nov. 2, 1989, 1 pg.
Cash Management Balance Monitoring Agreement Form 1 sheet.

Memorandum from Ed Piner, Subject: Discontinuation of Automatic Balance Monitoring in conjunction with Insured Savings Accounts, May 21, 1991, 1 pg.
Blank form letter from Edward N. Piner, May 24 1991, 1 pg.
Letter from First City National Bank of Austin, Sep. 20, 1982, 5 pgs.
First City, Texas—Austin, Special Products, Feb. 20, 1992, with Schedule A & Schedule B, 6 pgs.
Letter From Oliver I. Ireland, Associate General Counsel, Board of Governors fo the Federal Reserve System, Jun. 22, 1988, 5 Sheets.
Alliance Insured Account, Information Statement, Sep. 1999, 6 sheets.
Lawsuit by Carlo DeBlasio et al. and Merrill Lynch & Co., Inc. et al., Opinion and Order, Jul, 27, 2009, Civil Action No. 07 CIV. 318, 47 pgs.
Board of Governors of the Federal Reserve System, Blank Form Letter, Apr. 22, 2004, 8 pgs.
FDIC Law, Regulations, Related Acts, 4000—Advisory Opinions, FDIC—93-35, Jun. 28, 1993, 2 sheets.
§204.134, 12 CFR Ch. 11 (Jan. 1, 2009 Edition), 2 sheets.
Money Fund $$ Moving to Bank Deposits, *6 FRC Monitor*, Dec. 2003, 2 sheets.
Crane, P. & Krasner, Mike, *An iMoney Net Special Report*™, "Brokerage Cash Sweep Options: The Shift from Money Funds to FDIC-Insured Bank Deposit Accounts", Nov. 2004, 64 pgs.
The May 1998 Senior Financial Officer Survey, *Board of Govenors of the Federal Reserve System*, with Appendix A, 48 pgs.
Interest Rate Review® A Publication of *Meyer Weekly Interest Rate Survey*, A Look At Tiers, vol. II, No. 4, Apr. 1987, 6 pgs.
Interest Rate Review© A Publication of *Meyer Weekly Interest Rate Survey*, A Study of Historical Rates and Yields, vol. II, No. 6, Jun. 1987, 8 pgs.
Blank form letter to Oliver Ireland, Oct. 7, 1994, 1 pg.
Letter to L.P. Fleming, Jr. Esq., Feb. 7, 1995, 3 pgs.
Letter to James E. Creekman, Aug. 1, 1995, 4 pgs.
Letter to Brenda L. Skidmore, Aug. 30, 1995, 4 pgs.
Merrill Lynch & Co., Inc. Form 10-K405 (Annual Report (Regulation S-K, item 405)), Filed Mar. 14, 2002 for the Period Ending Dec. 28, 2001, with Schedules, Exhibits, and 2001 Annual Report, 248 pgs.
Merrill Lynch & You, "Financial Services The Way You Want, When You Want Them," Jan. 2000 4 Sheets.
Merrill Lynch, Information Statement Regarding Changes to Interest Rates on Deposits in the Merrill Lynch Banks, Document 64-14, Nov. 12, 2007, Case 1:07-cv-00318, 2 sheets.
Street Talk, "Merrill Moves CMA Cash to Bank", *On Wall Street*, Nov. 2000, 1 sheet.
Quest Insured Account, *QUESTessentials*, 3 sheets.
Quest Insured Account, *Information Statement*, 5 sheets.
OCC Insured Bank Deposit Account, 3 sheets.
Insured Bank Deposit Account, *Information Statement*, Jul. 1, 2000, 2 sheets.
Letter from Marilyn J. Hensle, announcing Salomon Smith Barney Bank Deposit Program.$^{SM}$, with Q&A, 14 sheets.
Bank Deposit program Disclosure Statement, *Salomon Smith Barney*, 3 sheets.
FDIC Law, Regulations, Related Acts, 4000—Advisory Opinions, FDIC-87-25, Oct. 22, 1987, 1 sheet.
FDIC Law, Regulations, Related Acts, 4000—Advisory Opinions, FDIC-86-21, Jul. 23, 1986, 2 sheets.
The Merrill Lynch Cash Management Account, Financial Service, 18 pgs.
A Guide to Your CMA Account, 1995, 19 pgs.
Insured Savings Account Fact Sheet, The Merrill Lynch Cash Management Account Financial Service, 1985, 4 pgs.
CMA Insured Savings Account Fact Sheet, 1997, 13 pgs.
Blackwell, Rob, Salomon's Sweep Plan Raises FDIC Fund Alarm, *American Banker*, Dec. 6, 2000, 2 pgs.
Insured Deposit Account (IDA), May 21, 1996, 11 pgs.
An Introduction to the Smith Barney *Insured Deposit Account*, 1995, 8 pgs.
Memorandum from Ted Hamilton re: Insured Deposit Account, Oct. 10, 1995, 13 pgs.
The Insured Deposit Account: *"Money in the Bank"*, 1997, 2 sheets.

Merrill Joins Money Market Account, CMA; Broker Begins Testing With 12 Institutions, *Lexis Nexis*, Sep. 23, 1983, 4 pgs.
Form 8-K Merill Lynch & Co Inc—MER, filed: Mar. 7, 2002, Report of unscheduled material events or corporate changes, 41 pgs.
Lawsuit by Island Intellectual Property LLC and Intrasweep LLC against Deutsche Bank Trust Company Americas and Total Bank Solutions, Complaint for Patent Infringement, Jury Trial Demanded, Feb. 23, 2010, Case No. 10 CV 1518, (Document 1).
Lawsuit by Island Intellectual Property LLC and Lids Capital LLC against Deutsche Bank Trust Company Americas and Total Bank Solutions, Complaint for Patent Infringement, Jury Trial Demanded, Mar. 16, 2010, Case No. 10 CV 2268.
Quest Cash Management Services Memorandum to Torn Duggan, Re: Quest Insure Account, Nov. 16, 1993.
Lawsuit by Island Intellectual Property LLC, Lids Capital LLC, Double Rock Corporation, and Intrasweep LLC against Deutsche Bank Trust Company Americas, and Total Bank Solutions, LLC, Defendants' Preliminary Invalidity Contentions, Mar. 12, 2010, Civil Action No. 09 Civ. 2675 (VM) (AJP).
Lawsuit by Island Intellectual Property LLC and Intrasweep LLC against Institutional Deposits Corp., Defendant Institutional Deposits Corp.'s Preliminary Invalidity Contentions, Case No. 09-CV-03079-JEC.
Exhibit 1, Invalidity Chart: IMA and Insurance Plus Service Agreement, U.S. Patent No. 7,509,286, 21 pgs.
Exhibit 2, Invalidity Chart: Investors Money Accounts$^{SM}$ System, U.S. Patent No. 7,509,286, 26 pgs.
Exhibit 3, Invalidity Chart: Insured Money Account System, U.S. Patent No. 7,509,286, 26 pgs.
Exhibit 4, Invalidity Chart: U.S. Patent No. 4,985,833 (Oncken), U.S. Patent 7,509,286, 21 pgs.
Exhibit 5, Invalidity Chart: First City Bank of Texas' Insured Savings Program, U.S. Patent No. 7,509,286, 39 pgs.
Exhibit 6, Invalidity Chart: Quest Insured Account, U.S. Patent No. 7,509,286, 19 pgs.
Exhibit 7, Invalidity Chart: CIBC World Markets—Insured Bank Deposit Account, U.S. Patent No. 7,509,286, 16 pgs.
Exhibit 8, Invalidity Chart: Merrill Lynch CMA/ISA Service, U.S. Patent No. 7,509,286, 72 pgs.
Exhibit 9, Invalidity Chart: 1983 Fed Letter, U.S. Patent No. 7,509,286, 16 pgs.
Exhibit 10, Invalidity Chart: Merrill Lynch Banking Advantage Program ("MLBA Program"), U.S. Patent No. 7,509,286, 22 pgs.
Exhibit 11, Invalidity Chart: Merrill Lynch & You + MLBA Information Statement, U.S. Patent No. 7,509,286, 18 pgs.
Exhibit 12, Invalidity Chart: Smith Barney Insured Deposit Account, U.S. Patent No. 7,509,286, 22 pgs.
Exhibit 13, Invalidity Chart: Smith Barney Bank Deposit Program, U.S. Patent No. 7,509,286, 18 pgs.
Exhibit 14, Invalidity Chart: Alliance Insured Account, U.S. Patent No. 7,509,286, 16 pgs.
Exhibit 15, Invalidity Chart: Reserve's American Express Presentation, U.S. Patent No. 7,509,286, 16 pgs.
Exhibit 16, Invalidity Chart: U.S. Patent No. 7,376,606 (Jacobsen), U.S. Patent No. 7,536,350, 6 pgs.
Exhibit 17, Obviousness Combinations Chart, U.S. Patent No. 7,509,286, 351 pgs.
Product Bulletin from Bill McCain, Subject: Insured Savings Product Announcement, May 8, 1989, 7 pgs.
Letter From William W. Wiles, Secretary of the Board, Board of Governors of the Federal Reserve System, Jun. 22, 1983, 6 Sheets.
Lawsuit by *Carlo DeBlasio* et al. v. *Merrill Lynch & Co., Inc.* et al., Second Amended Class Action Complaint, Jury Trial Demanded, Jun. 11, 2007, Civil Action No. 07 cv 318, 137 pgs.
Investors MoneyAccount$^{SM}$ and Insurance Plus Service Agreement, Schedule A, Mar. 1994; 3 sheets.
Investors MoneyAccount$^{SM}$ (an FDIC-insured money market account), Apr. 1996; 4 sheets.
Investors MoneyAccount$^{SM}$ The FDIC-Insured Money Market with an Important Plus., Apr. 1996; 2 sheets.
Investment Company Act of 1940—Section 3(a)(1), 2(a)(36); Securities Act of 1933—Section 2(1), Nov. 29, 1985, Kempter Financial Services, Inc., 9 pgs.

Insured Money Account Program Agreement and Disclosure Statement, Mar. 2000; 11 sheets.
First National Bank in Brookings, Certificates of Deposit; Jul. 17, 2009; 5 sheets.
Summary of Commentary on Current Economic Conditions by Federal Reserve Districts, Jan. 1985, 44 pgs.
The Insured Savings Account, Issuer Guide to Offering MMDAs through Merrill Lynch, Jul. 1986; 27 pgs.
Insured Savings Account Fact Sheet, The Merrill Lynch Cash Management Account Financial Service, Apr. 1987, 11 pgs.
CMA Insured Savings Account Fact Sheet, Jul. 1994, 9 pgs.
Adler, Joe, "Promontory to Roll Out Deposit Service Insuring Liquid Funds", American Banker, Feb. 22, 2010, 1 sheet.
Blackwell, "New Pitch: Deposit Insurance Sharing," American Banker Online, 4 Sheets, Jan. 21, 2003.
Litigation Notice After Payment of Issue Fee filed in Parent U.S. Appl. No. 10/382,946, Apr. 3, 2009, 6 pages.
Declaration of Mr. Bruce Bent II, Vice Chairman and Registrant of Applicant. (3 Sheets) and Exhibits A, B, C and D; Feb. 27, 2007; 6 Sheets.
Deutsche Bank Insured Deposit Program, Marketing Literature; 2007, 3 pages.
Dreyfus Insured Deposit Program, Disclosure Statement and Terms and Conditions, Dreyfus A BNY Mellon Company, Jan. 2008; 8 Sheets.
Dreyfus Insured Deposit Program, Multiple List Program—Effective May 11, 2009, 1 Sheet.
Federal Register: Oct. 9, 1997 (vol. 62, No. 196), pp. 52809-52868. http://www.fdic.gov/news/news/inactivefinancial/1997/fil97111b.html.
Lawsuit by Island Intellectual Property LLC and Lids Capital LLC against Deutsche Bank Trust Company Americas and Total Bank Solutions, LLC, Deutsche Bank Trust Company answer to plaintiffs' Mar. 16, 2010 complaint and counterclaims, May 4, 2010, Civil Action No. 09 Civ. 2675 (VM) (AJP) (Document 113).
Lawsuit by Island Intellectual Property LLC and Lids Capital LLC against Deutsche Bank Trust Company Americas and Total Bank Solutions, LLC, Total Bank Solutions, LLC's answer to plaintiffs' Mar. 16, 2010 complaint and counterclaims, May 4, 2010, Civil Action No. 09 Civ. 2675 (VM)(Documetn 114).

MONEY FUND BANKING SYSTEM WITH MULTIPLE BANKS AND/OR RATES

CROSS-REFERENCE TO RELATED PATENT APPLICATIONS

This application is a Continuation of U.S. application Ser. No. 09/677,535, filed Oct. 2, 2000, which is incorporated herein by reference in its entirety, which is a Continuation-In-Part of U.S. application Ser. No. 09/176,340, filed Oct. 21, 1998, now U.S. Pat. No. 6,374,231, incorporated herein by reference in its entirety.

BACKGROUND OF THE INVENTION

1. Field of the Invention

This invention generally relates to the field of account transaction processing, and more specifically, an improved system for processing and administering a demand account or money market account in combination with an insured deposit account, and optionally where the accounts are distributed over a plurality of banking institutions.

2. The State of the Art

The Federal Deposit Insurance Corporation ("FDIC") is a federal governmental entity that provides insurance for deposits in most banks and savings institutions in the United States Bank; deposits are insured by the FDIC's Bank Insurance Fund ("BIF") and savings institutions' deposits are insured by the FDIC's Savings Association Insurance Fund ("SAIF"). The rules governing insurance of deposits of institutions insured by the BIF and the SAIF are the same. The FDIC bases insurance coverage on the concept of ownership rights and capacities: funds held in different ownership categories are insured separately from each other; and funds owned by the same entity but held in different accounts are subsumed under the same insurance coverage. The amount of insurance coverage provided to depositors of each institution insured by BIF and SAIF is the same: $100,000.00 to the owners(s) of the funds in the account(s), including principal and interest.

As disclosed in our prior application Ser. No. 09/176,340 referenced above, a system is provided for managing a plurality of demand accounts for multiple clients whose funds are held at a banking institution in a single insured deposit account. That system provides an entity with the ability to deposit funds into a demand account from various sources, and to make payments from the demand account via different instruments, without the limitation as to the number of transfers, and still earn interest on the funds in the clients' accounts because the funds are effectively maintained in a deposit account. Even with the above-mentioned innovative system, investors carrying amounts in excess of $100,000 in their accounts are disadvantaged because the FDIC insurance is limited to $100,000, so any amount over $100,000 is not protected by FDIC insurance. It was with this realization that the present invention was made.

SUMMARY OF THE INVENTION

In one embodiment, a method is disclosed for managing a plurality of individual client deposits for multiple clients, comprising: accessing, by a computer, in the performance of one or more of the following steps, an electronic database, stored on one or more computer-readable media, comprising: aggregated account information for a plurality of Federal Deposit Insurance Corporation (FDIC)-insured and interest-bearing aggregated deposit accounts held in a plurality of banking institutions, wherein funds from client deposits of a plurality of clients are aggregated with funds of other client deposits in the aggregated deposit accounts held in the banking institutions; client information for each of a plurality of the respective clients, i, comprising: (i) a total of a respective client's funds deposited across a plurality of the FDIC-insured interest-bearing aggregated accounts held in a plurality of the banking institutions; and (ii) a maximum deposit percentage of the respective client funds to be held in at least one of the banking institutions; maintaining funds for said individual clients in a plurality of the FDIC-insured, interest-bearing aggregated deposit accounts at a plurality of banking institutions, wherein each of the banking institutions has at least one of the aggregated deposit accounts; processing, by computer, client transaction data comprising data for each of one or more deposits/transfers and/or one or more withdrawals/transfers for one or more of said clients, with the data comprising a respective amount for each respective deposit/transfer and each respective withdrawal/transfer; making needed deposits to, or needed withdrawals from one or more of said aggregated deposit accounts based on the data for one or more of the deposit/transfers and/or the withdrawals/transfers and based, at least in part, on the maximum deposit percentage in the database for one or more of the clients; and updating the database based on the client's deposits/transfers and/or withdrawals/transfers.

In a further embodiment, a method is disclosed for managing a plurality of individual client deposits for multiple clients, comprising: receiving from one or more respective clients a respective maximum amount that is less than a Federal Deposit Insurance Corporation (FDIC) insurance limit, which respective maximum amount is to be held in at least one of the banking institutions for that respective client, and storing this maximum amount associated with the respective client in an electronic database; accessing, by a computer, in the performance of one or more of the following steps, the electronic database, stored on one or more computer-readable media, comprising: aggregated account information for a plurality of Federal Deposit Insurance Corporation (FDIC)-insured and interest-bearing aggregated deposit accounts held in a plurality of banking institutions, wherein funds from client deposits of a plurality of clients are aggregated with funds of other client deposits in the aggregated deposit accounts held in the banking institutions; client information for each of a plurality of the respective clients, i, comprising: (i) a total of a respective client's funds deposited across a plurality of the FDIC-insured interest-bearing aggregated accounts held in a plurality of the banking institutions; and (ii) a respective maximum amount to be held in at least one of the respective banking institutions; maintaining funds for said individual clients in a plurality of the FDIC-insured, interest-bearing aggregated deposit accounts at a plurality of the banking institutions, wherein each of the banking institutions has at least one of the aggregated deposit accounts; processing, by computer, client transaction data comprising data for each of one or more deposits/transfers and/or one or more withdrawals/transfers for one or more of said clients, with the data comprising a respective amount for each respective deposit/transfer and each respective withdrawal/transfer; making needed deposits to, or needed withdrawals from one or more of said aggregated deposit accounts based on the data for one or more of the deposit/transfers and/or one or more of the withdrawals/transfers and in compliance with the respective maximum amount specified in the database for one or more of the respective clients for one or more of the banking institutions; and updating the database based on the client's deposits/transfers and/or withdrawals/transfers.

In one embodiment, a system is also disclosed for managing a plurality of demand accounts for multiple clients whose funds are held at a banking institution in a single insured deposit account.

In another embodiment, a system is disclosed for managing a plurality of demand accounts for multiple clients whose funds are held at one or more banking institutions in one or more single insured deposit accounts that, from the viewpoint of the investor, removes the $100,000 limitation of FDIC insurance for that individual investor.

In another embodiment, a system is disclosed for administering a plurality of accounts containing in excess of the FDIC or other insurance limit and continue to qualify for FDIC insurance.

In a further embodiment, a system is disclosed that administers individual client deposits to and withdrawals from each of their demand accounts. The system includes a database having each client's information for each account administered. The system monitors the use of the funds from each account by selectively authorizing or rejecting each demand payment request for each account of a particular client. Periodically, net transaction information is determined from the sum of the demand account deposits and withdrawals. The net transaction information is used to determine whether to deposit funds or to withdraw funds from a single deposit account to a client's demand account(s) while updating the database for each client's deposit and authorized demand payment. The system then determines whether each client's account contains more than a specified amount (e.g., $90,000) and distributes any amounts over the specified amount into another account at a preselected banking institution.

In practice, when an investor's account balance exceeds $90,000 in any one account, the excess funds are automatically moved to a second deposit account at another preselected bank. The client will maintain one insured deposit clearance account while the multiple deposit accounts will be transparent to the investor. All transactions to and from the accounts will post to the investor's insured deposit account, although they may be debited from multiple deposit accounts held at various banks. At the time an Insured Deposit Account is opened, the investor is given the option to choose a preferred bank, to choose a list of preferred banks in a desired (or random) order of preference, and to exclude one or more banks. The system will debit and credit the multiple deposit accounts on the investor's behalf, and in the event that the investor does not preselect a bank, the system will automatically designate a bank or banks. The client may also select the order of preference for deposits and withdrawals. For example, if the investor opened his Insured Deposit Account with $170,000, he could also indicate that his assets should be invested in Bank A and Bank C. He may also indicate that bank C is preferred. In this example, $90,000 would be deposited into Bank C and $80,000 into Bank A. If a check were written or the investor chose to redeem funds directly, the withdrawals would be made from Bank A. Withdrawals would not be made from Bank C until all funds had been redeemed from Bank A. Similarly, if the investor chose Bank C as preferred and chose to exclude Bank B, then $90,000 would be deposited into Bank C and $80,000 into Bank A. The investor also can choose the deposit cap for each of multiple banks selected, or can specify deposit caps for default banks chosen by the system (e.g., no bank to hold more than 40% of the investor's funds). Of course, the investor can also specify that all funds be held in a single bank, even if the amount exceeds $100,000. The report the investor receives may refer to all of the assets and transactions in the investor's Insured Clearance Account (a single account), or the investor may be shown a report listing all of the sub-accounts (if any) where the funds are held and in which transactions occurred.

The choice of Banks is held on the investor's account and the system will read the Bank indicator and determine which bank deposit account should be debited or credited. The system will automatically group together all transactions for each bank. At the end of the business day the deposit accounts at the various banks with be either debited or credited. The debit or credit to the deposit account is the net transaction for all activity that occurred that day.

As a result of the present invention the investor earns interest on the balance in his Insured Deposit Account where the interest rate earned can be the same regardless of the bank(s) selected, or may vary depending on the banks selected, while continuing to qualify his account funds for FDIC insurance.

BRIEF DESCRIPTION OF THE DRAWINGS

In the drawings, in which like references characters designate like or corresponding parts throughout the several views, the views are.

DETAILED DESCRIPTION OF SPECIFIC EMBODIMENTS

The present invention will be described with reference to an administrator, which can be a brokerage firm, a bank, or another financial entity with which clients can institute financial transactions such as deposits and demand payments. The administrator appears to each client as if it were, at least in part, a bank, by accepting deposits for the client's accounts and by authorizing (and then making) payments demanded by the client from his or her account. The funds for all of the clients are pooled into a single deposit account that is maintained as an insured deposit account at a licensed banking institution.

Figure 1A:
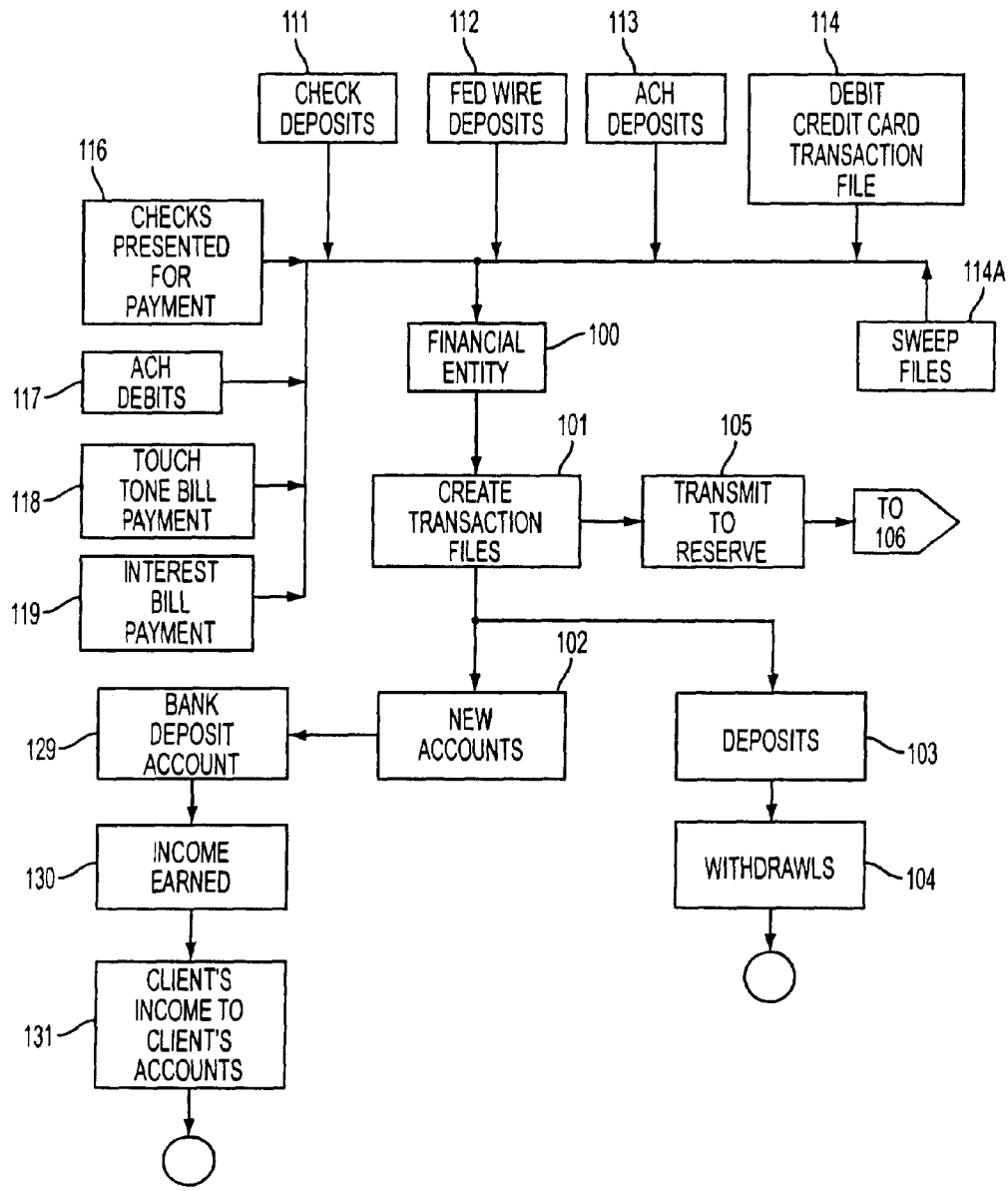
FIG. 1A is a flowchart depicting processing steps the system follows at the administrator's end.

Referring to FIG. 1A, the financial entity 100, which may be a bank, a brokerage or another entity where financial transactions take place or can be facilitated, creates transaction files 101 which are transmitted to Reserve 105; Reserve (or the Reserve System) is the administrator or other entity in charge of administering at least one of the deposit accounts. New account files 102 can be transmitted to Reserve; a new investor account may need to be opened; a new account means organizing and coordinating information to service a new investor for the present system, even though that investor may already be a client of a financial entity 100 for other investment vehicles. A new account 102 becomes part of an existing bank deposit account 129 that collects earned income 130 which transfers the client's income to the client's accounts 131; of course at some time the deposit account must be established with clients' funds. The transaction files represent the addition of funds by check (such as drawn on another institution, or a different demand account from the same institution), wire or electronic transfer, ACH, credits (such as from a debit or credit card merchant), or a sweep from one of the client's other accounts. Accordingly, encompassed in the transaction file are deposits 103 and withdrawals 104. A "sweep" includes the automatic transfer of funds, such as the automated transfer of interest from one account into the client's account, as well as the automated transfer of funds out of the client's account (such as for payment of a securities trade); thus, a sweep may be from one of the client's accounts to another. The responsibility for maintaining the deposit account can be assigned by the administrator to a third party.

Figure 1B:
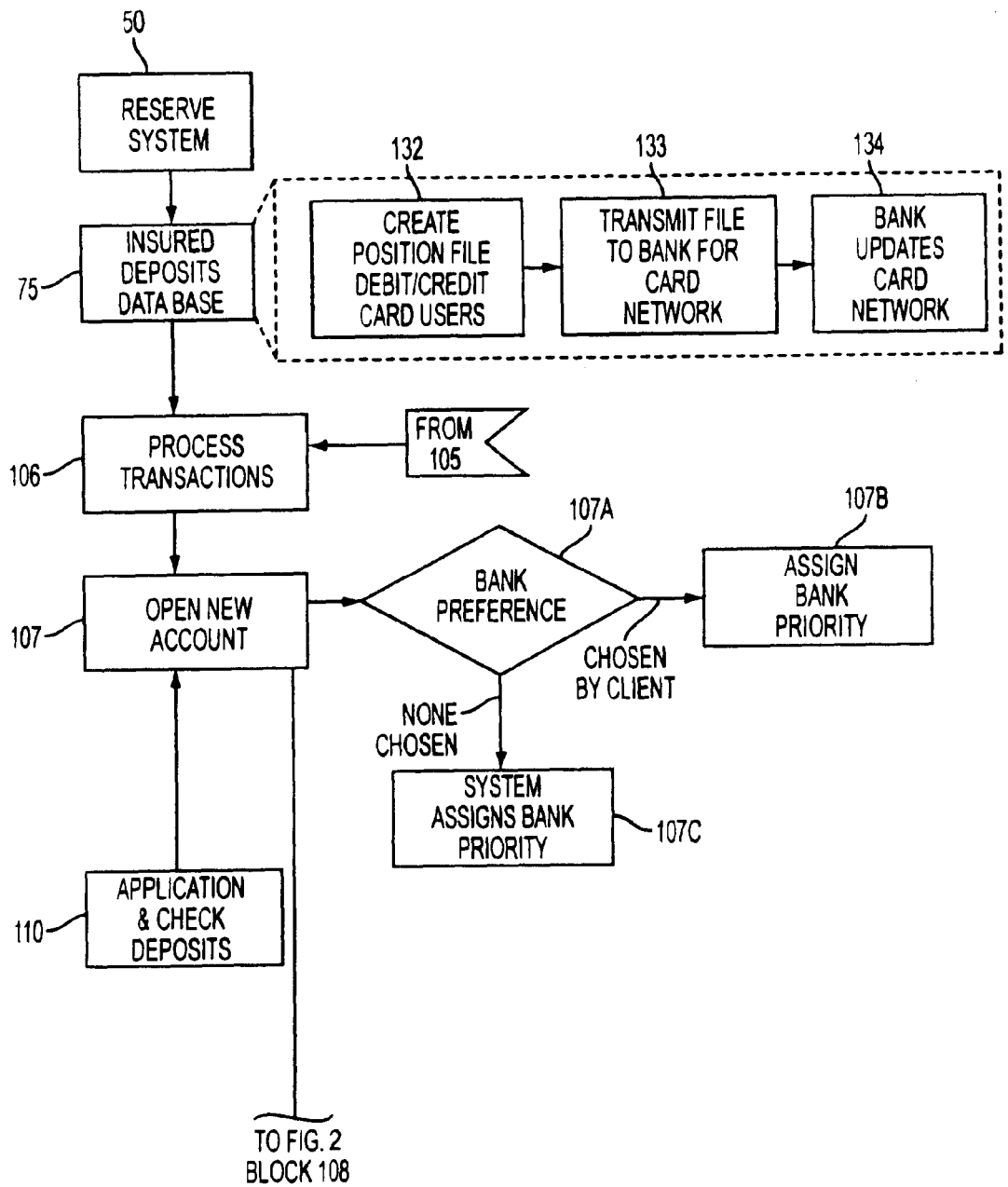
FIG. 1B is a flow chart depicting additional processing steps according to the present invention.

Referring now to FIG. 1B, the Reserve System 50 contains an insured deposit database 75 where a position file for debit/credit card users is created 132 and transmitted to a bank for a debit/credit card network 133 where the bank then updates the network 134. The system updates the data base 75 and processes transactions 106 (from 105, FIG. 1A) and opens a new account 107 where application and check deposits are processed 110. The bank preference 107A is the list of banks and the order of preference for deposits and withdrawals held on the account, including a list of banks to be excluded (if any), and the maximum percentage and/or amount of funds to be held in each bank. The client's bank preference data is added to the account at 107B. If the client does not select values for any of these variables, the system can provide default values for the banks and their order at 107C sufficient for all of the client's funds. When possible the system will not assign a bank that is in the same state in which the client resides.

Figure 2:
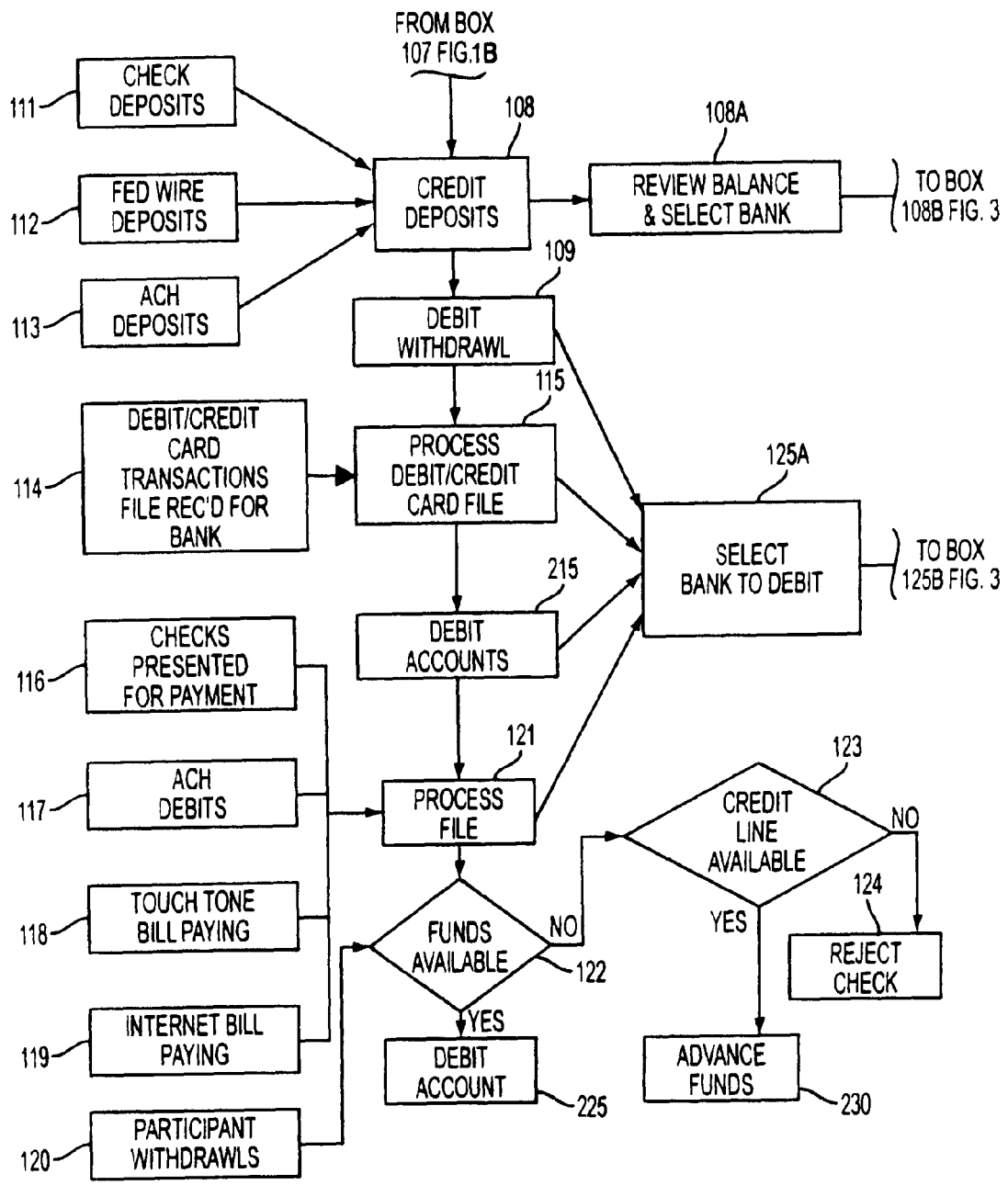
FIG. 2 is a flowchart depicting processing steps regarding the determination of a available funds according to the present invention.
Figure 3:
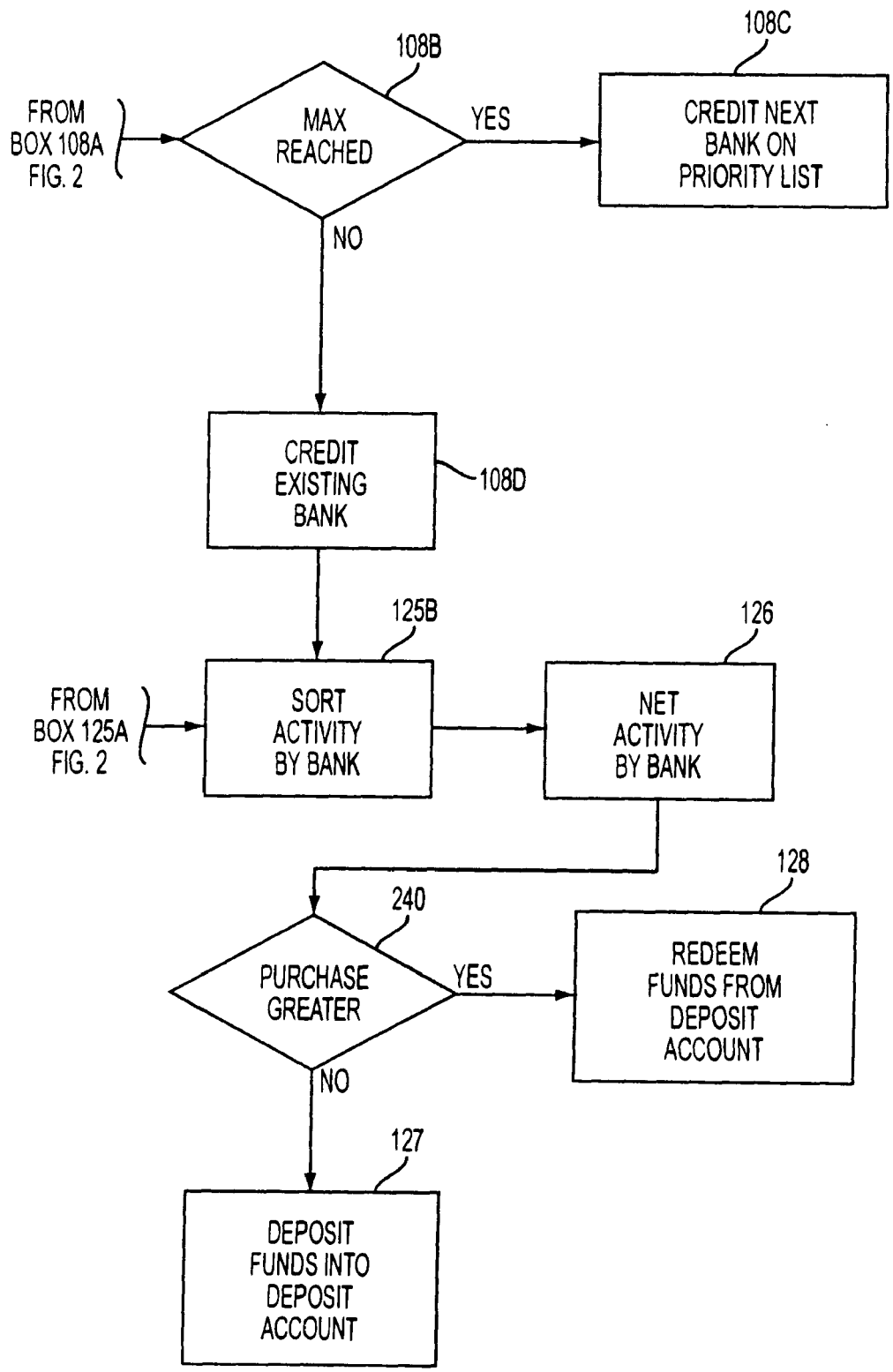
FIG. 3 is a flow chart depicting processing steps associated with the completion of the banking system process according to the present invention.

Referring to FIG. 2 it can be seen that when a deposit, either a check deposit 111, federal wire deposit 112, ACH deposit, sweep, or other deposit is credited to the client's account 108, the system will review where the existing funds of the accounts are deposited 108A. If the client's balance has reached the maximum allowable balance for the existing bank 108B, as shown in FIG. 3, the system will then select the next bank on the preference list attached to the account 108C. If the maximum allowable balance has not been reached in the existing bank, the system will credit the additional funds to that bank 108D.

Still referring to FIG. 2, the procedure for processing withdrawals can be seen. Various methods of withdrawing funds are debit withdrawal 109, processing debit or credit card transactions such as debit/credit card files 115, direct debit accounts 215, and processing of files 121. Processing of a debit/credit card file 115 utilizes data accumulated from debit/credit card transactions received from the banks 114. The processing of file 121 procedure utilizes one of various sources of data such as a check presented for payment 116, ACH debits 117, touch tone bill paying 118, and/or interne bill paying 119.

After processing the debit procedure, the system will review the bank preference list and select the appropriate bank to debit 125A. The system will sort all the daily transactions by the bank 125B (see FIG. 3). The activity for each bank will then be netted 126 and the appropriate deposit or withdrawals made.

The system will then determine whether funds are available 122, which function is also associated with other participant withdrawals 120. If the funds are available, the account is debited 225. If the funds are not available, however, the system determines whether a credit line is available 123. If a credit line is available, then funds are advanced 230 to cover the debit; if not the transaction is rejected 124.

Referring to FIG. 3, as previously stated the system determines whether the client's balance reaches its maximum 108B and if so the next bank on the list selected by the client is credited 108C. If the maximum is not reached the existing bank is credited 108D. Information and activities associated with processed debits and credits of the client's accounts from 125A are sorted by the bank 125B and the net activity by the bank is determined 126. The system then determines whether the deposits and credits were greater than the withdrawals and debits 240 and if so, the excess funds are deposited into a deposit account 127. If the debits and withdrawals were greater than the credits the difference is redeemed from the deposit account 128.

Thus, by practicing this invention, the client is provided with FDIC insurance in excess of $100,000.00 because the client's holdings are maintained in multiple insured deposit accounts, which may be in multiple banks.

The foregoing description is meant to be illustrative and not limiting. Various changes, modifications, and additions may become apparent to the skilled artisan upon a perusal of this specification, and as such are meant to be within the scope and spirit of the invention as defined by the Claims.

What is claimed is:

1. A method for managing a plurality of individual client deposits for multiple clients, comprising:
    accessing, by a computer, in the performance of one or more of the following steps, an electronic database, stored on one or more computer-readable media, comprising:
        aggregated account information for a plurality of Federal Deposit Insurance Corporation (FDIC)-insured and interest-bearing aggregated deposit accounts held in a first plurality of banking institutions, wherein funds from client deposits of a plurality of clients are aggregated with funds of other client deposits in the aggregated deposit accounts held in the banking institutions;
        client information for each of a plurality of the respective clients, comprising:
            (i) a total of the respective client's funds deposited across a plurality of the banking institutions in one or more of the FDIC-insured interest-bearing aggregated accounts held therein; and
            (ii) a maximum deposit percentage of the respective client funds to be held in at least one of the banking institutions;
    allocating, by the computer, the client funds among a second plurality of the banking institutions in one or more aggregated deposit accounts held therein, based, at least in part, on the maximum deposit percentage in the database for one or more of the clients;
    netting for at least one of the respective banking institutions, by the computer, client funds allocated to the one respective banking institution to obtain a net amount of funds for the at least one respective banking institution;
    determining an amount of funds to be transferred to or from one or more of said aggregated deposit accounts based on data from the netting step; and
    updating, by the computer, the database based on the allocation of client funds.

2. The method as defined in claim 1, further comprising:
    receiving from one of the respective clients, for each respective one of a plurality of the banking institutions, a respective maximum deposit percentage to be held in the respective banking institution for funds of that respective client and storing this maximum deposit percentage associated with the respective client in the electronic database;
    wherein in the determining step, one or more transfers to, or transfers from one or more of said aggregated deposit accounts in one or more of the banking institutions is determined, at least in part, based on one or more of the respective maximum deposit percentages for the respective one client.

3. The method as defined in claim 1, further comprising:
receiving, from one or more of the respective clients, a respective maximum deposit percentage to be held in the respective banking institution for funds of that respective client and storing this respective maximum deposit percentage as the maximum deposit percentage for that respective client in the electronic database.

4. The method as defined in claim 1, wherein the withdrawal data comprises data for one or more withdrawals/transfers by check, debit card, credit card or ACH.

5. The method as defined in claim 1, further comprising:
receiving a selection of an order of preference of a third plurality of the banking institutions for deposit of funds of the client; and
wherein in the determining step, transfers to one or more of said aggregated deposit accounts are made to the third plurality of the banking institutions in the order of preference selected by the client.

6. The method as defined in claim 1, further comprising:
receiving a selection of an order of preference of a third plurality of the banking institutions for withdrawal of funds of the client; and
wherein in the determining step, transfers from one or more of said aggregated deposit accounts are made from the third plurality of the banking institutions in the order of preference selected by the client.

7. The method as defined in claim 1, further comprising:
receiving, by computer, client transaction data comprising data for each of one or more deposits/transfers and/or one or more withdrawals/transfers for one or more of said clients, with the data comprising a respective amount for each respective deposit/transfer and each respective withdrawal/transfer;
netting, by computer, on a regular basis, the data for the client deposits/transfers and/or the withdrawals/transfers from a plurality of the clients to obtain the net amount.

8. The method as defined in claim 7,
wherein the transaction data for one of the clients comprises data for more than six withdrawals/transfers by one or more of check, debit card, credit card or ACH within a month.

9. The method as defined in claim 1, further comprising:
determining a respective amount of interest owed to each of a plurality of the respective clients as a function of a total amount of funds of the client held in the FDIC-insured interest-bearing aggregated deposit accounts; and
distributing by crediting interest received from said FDIC-insured interest-bearing aggregated deposit accounts to said respective clients based on the respective amounts determined for the respective clients.

10. The method as defined in claim 1, wherein the electronic database maintains aggregated transaction account information for a plurality of FDIC-insured and interest-bearing aggregated deposit accounts held in a fixed number of banking institutions in a program, and
wherein the steps are performed using the fixed number of banking institutions in the program.

11. The method as defined in claim 1, wherein the allocating step further comprises:
(i) determining whether funds of the respective client account held in one of the banking institutions in the one or more FDIC-insured interest bearing aggregated deposit accounts held therein is more than a specified amount; and
(ii) generating data for allocating any amount over said specified amount into at least one other FDIC-insured interest bearing aggregated deposit account held at least one other of the banking institutions in which the total of said client's funds will not exceed the specified amount.

12. A system for managing a plurality of client deposits for multiple clients, comprising:
one or more computers comprising memory wherein the memory stores computer-readable instructions that, when executed, cause the one or more computers to perform the steps:
accessing, by computer, in the performance of one or more of the following steps, an electronic database, stored on one or more computer-readable media, comprising:
aggregated account information for a first plurality of Federal Deposit Insurance Corporation (FDIC)-insured and interest-bearing aggregated deposit accounts held in a plurality of banking institutions, wherein funds from client deposits of a plurality of clients are aggregated with funds of other client deposits in the aggregated deposit accounts held in the banking institutions;
client information for each of a plurality of the respective clients, comprising:
(i) a total of the respective client's funds deposited across a plurality of the banking institutions in one or more of the FDIC-insured interest-bearing aggregated accounts held therein; and
(ii) a maximum deposit percentage of the respective client funds to be held in at least one of the banking institutions;
allocating, by the computer, the client funds among a second plurality of the banking institutions in one or more aggregated deposit accounts held therein, based, at least in part, on the maximum deposit percentage in the database for one or more of the clients;
netting for at least one of the respective banking institutions, by the computer, client funds allocated to the one respective banking institution to obtain a net amount for the at least one respective banking institution;
determining, by the computer, an amount of funds to be transferred to or from one or more of said aggregated deposit accounts based on data from the netting step; and
updating, by the computer, the database based on the allocation of client funds.

13. The system as defined in claim 12, further comprising computer-readable instructions for configuring the one or more computers for:
receiving from one of the respective clients, for each respective one of a plurality of the banking institutions, a respective maximum deposit percentage to be held in the respective banking institution for funds of that respective client and storing this maximum deposit percentage associated with the respective client in the electronic database;
wherein in the determining step, one or more transfers to, or transfers from one or more of said aggregated deposit accounts in one or more of the banking institutions is determined, at least in part, based on one or more of the respective maximum deposit percentages for the respective one client.

14. The system as defined in claim 12, further comprising computer-readable instructions for configuring the one or more computers for:

receiving, from one or more of the respective clients, a respective maximum deposit percentage to be held in the respective banking institution for funds of that respective client and storing this respective maximum deposit percentage as the maximum deposit percentage for that respective client in the electronic database.

15. The system as defined in claim 12, wherein the withdrawal data comprises data for one or more withdrawals/transfers by check, debit card, credit card or ACH.

16. The system as defined in claim 12, further comprising computer-readable instructions for configuring the one or more computers for:
   receiving a selection of an order of preference of a third plurality of the banking institutions for deposit of funds of the client; and
   wherein in the determining step, transfers to one or more of said aggregated deposit accounts are made to the third plurality of the banking institutions in the order of preference selected by the client.

17. The system as defined in claim 12, further comprising computer-readable instructions for configuring the one or more computers for:
   receiving a selection of an order of preference of a third plurality of the banking institutions for withdrawal of funds of the client; and
   wherein in the determining step, transfers from one or more of said aggregated deposit accounts are made from the third plurality of the banking institutions in the order of preference selected by the client.

18. The system as defined in claim 12, further comprising computer-readable instructions for configuring the one or more computers for:
   receiving, by computer, client transaction data comprising data for each of one or more deposits/transfers and/or one or more withdrawals/transfers for one or more of said clients, with the data comprising a respective amount for each respective deposit/transfer and each respective withdrawal/transfer; and
   netting, by computer, on a regular basis, the data for the client deposits/transfers and/or the withdrawals/transfers from a plurality of the clients to obtain the net amount.

19. The system as defined in claim 18,
   wherein the transaction data for one of the clients comprises data for more than six withdrawals/transfers by one or more of check, debit card, credit card or ACH within a month.

20. The system as defined in claim 12, further comprising computer-readable instructions for configuring the one or more computers for:
   determining a respective amount of interest owed to each of a plurality of the respective clients as a function of a total amount of funds of the client held in the FDIC-insured interest-bearing aggregated deposit accounts; and
   distributing by crediting interest received from said FDIC-insured interest-bearing aggregated deposit accounts to said respective clients based on the respective amounts determined for the respective clients.

21. The system as defined in claim 12, wherein the electronic database maintains aggregated transaction account information for a plurality of FDIC-insured and interest-bearing aggregated deposit accounts held in a fixed number of banking institutions in a program, and
   wherein the steps are performed using the fixed number of banking institutions in the program.

22. The system as defined in claim 12, further comprising computer-readable instructions for configuring the one or more computers of the allocating step for:
   (i) determining whether funds of the respective client account held in one of the banking institutions in the one or more FDIC-insured interest bearing aggregated deposit accounts held therein is more than a specified amount; and
   (ii) generating data for allocating any amount over said specified amount into at least one other FDIC-insured interest bearing aggregated deposit account held at least one other of the banking institutions in which the total of said client's funds will not exceed the specified amount.

* * * * *